(12) United States Patent
Winig et al.

(10) Patent No.: US 6,702,128 B2
(45) Date of Patent: *Mar. 9, 2004

(54) STORAGE SYSTEM

(75) Inventors: Alan Winig, Wynnewood, PA (US);
Richard Winig, Villanova, PA (US);
James Eldon, Barto, PA (US)

(73) Assignee: Eye Designs LLC, Collegeville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/449,333

(22) Filed: May 30, 2003

(65) Prior Publication Data

US 2003/0192844 A1 Oct. 16, 2003

Related U.S. Application Data

(63) Continuation of application No. 10/054,835, filed on Jan. 23, 2002, now Pat. No. 6,581,788.

(51) Int. Cl.$^7$ ................................................ A47F 5/08
(52) U.S. Cl. .............................. 211/90.01; 248/220.43; 248/245; 211/183; 211/87.01; 211/70.6
(58) Field of Search ................................ 211/153, 187, 211/134, 90.01, 90.02, 88.01, 70.6, 87.01, 86.01, 105.1, 88.04, 175, 207, 208, 183; D6/511, 553, 567, 572, 574; 108/144.11, 147.11, 147.16, 147.17, 108, 152; 248/220.31, 220.41, 220.42, 220.43, 221.11, 222.11, 222.12, 222.51, 225.21, 227.1, 227.2, 231.81, 235, 250, 245

(56) References Cited

U.S. PATENT DOCUMENTS

| | | | |
|---|---|---|---|
| 1,958,772 A | | 5/1934 | Stewart |
| 1,992,857 A | | 2/1935 | Breedlove |
| 2,121,307 A | | 6/1938 | Swift |
| 2,785,919 A | | 3/1957 | Grondzik |
| 2,887,802 A | * | 5/1959 | Burmeister ............... 40/541 |
| 2,956,687 A | | 10/1960 | Robichaud |
| 2,995,256 A | | 8/1961 | Schoenfisch |
| 3,063,569 A | | 11/1962 | Huber |
| 3,565,020 A | * | 2/1971 | Schier et al. ............ 108/152 |
| 4,325,484 A | | 4/1982 | Berry |
| 4,340,144 A | * | 7/1982 | Cousins ............... 211/106.01 |
| 4,407,476 A | * | 10/1983 | Bohannan ................ 248/235 |

(List continued on next page.)

Primary Examiner—Jennifer E. Novosad
(74) Attorney, Agent, or Firm—Duane Morris LLP

(57) ABSTRACT

A storage system including a shelf and bracket item holder where the item holder is supported upon a planar panel. The shelf has two end edges and two shelf-brackets which include a substantially circumferential flange, a receptacle portion for receiving one of the end edges of the shelf, and an upper panel catch and a lower panel catch projecting outwardly from a same side of the circumferential flange in aligned spaced relation to one another. A cantilevered lock-release latch is positioned adjacent to the lower panel-catch so as to project from an end of the circumferential flange toward the lower panel-catch. When each of the upper and lower panel-catches are inserted through and occupy a corresponding one of the perforations in the panel such that each of the lock-release tabs of the lock-release latches engages the outer surface of the perforated panel thereby deflecting the lock-release latches away from the perforated panel, the shelf and brackets are moved relative to the perforated panel. This movement causes the lock-tabs to engage the rear surface of the perforated panel and the lock-release tabs of the lock-release latches to slide along the front surface and slip into the respective perforations occupied by the lower panel catches. This, in turn, allows the lock-release latches to spring-back and the lock-release tabs to enter the perforations occupied by their respective lower panel catches so as to secure the bracket in locked engagement with the perforated panel.

13 Claims, 30 Drawing Sheets

U.S. PATENT DOCUMENTS

| | | | |
|---|---|---|---|
| 4,439,884 A | | 4/1984 | Giorni |
| 4,450,961 A | * | 5/1984 | Bies et al. .................. 206/349 |
| 4,500,943 A | * | 2/1985 | Greene ....................... 361/690 |
| 4,508,301 A | * | 4/1985 | Nicholson et al. .......... 248/250 |
| 4,516,681 A | * | 5/1985 | Jahel ......................... 211/59.1 |
| 4,597,496 A | | 7/1986 | Kaplan |
| 4,619,428 A | * | 10/1986 | Bailey .................. 248/220.43 |
| 4,632,256 A | * | 12/1986 | Gambello .................... 211/50 |
| 4,720,069 A | * | 1/1988 | Bessinger .................. 248/250 |
| 4,771,897 A | * | 9/1988 | Ho ............................ 211/85.9 |
| 4,905,951 A | | 3/1990 | Putness |
| 4,936,565 A | * | 6/1990 | Fredrickson ............... 211/59.1 |
| 5,005,710 A | | 4/1991 | Hofer |
| 5,201,430 A | | 4/1993 | Artzer |
| 5,224,609 A | * | 7/1993 | Bauer et al. .................. 211/65 |
| 5,337,987 A | * | 8/1994 | Sawatsky ............... 248/231.81 |
| 5,482,168 A | * | 1/1996 | Welch et al. .............. 211/106 |
| 5,515,969 A | | 5/1996 | Schonenbach |
| 5,531,416 A | * | 7/1996 | Remmers ............... 248/222.51 |
| 5,573,111 A | | 11/1996 | Gordon et al. |
| 5,690,684 A | * | 11/1997 | Andrews et al. ............... 607/5 |
| 5,706,936 A | | 1/1998 | Bernstein |
| 5,711,419 A | | 1/1998 | Beales et al. |
| 5,711,435 A | * | 1/1998 | Morison et al. ......... 211/90.01 |
| 5,738,228 A | | 4/1998 | Bittinger |
| 5,855,274 A | | 1/1999 | Piao |
| 5,909,936 A | * | 6/1999 | Daniels et al. ........... 312/334.1 |
| 5,915,307 A | * | 6/1999 | Tisbo et al. ................. 108/152 |
| 5,915,572 A | | 6/1999 | Hancock |
| 5,970,663 A | * | 10/1999 | McDonough ............... 52/36.4 |
| 6,000,912 A | | 12/1999 | Takada et al. |
| 6,019,331 A | * | 2/2000 | Hoogland et al. .......... 248/250 |
| 6,050,426 A | * | 4/2000 | Leurdijk .................. 211/94.01 |
| 6,070,747 A | * | 6/2000 | Shea ....................... 211/87.01 |
| 6,250,466 B1 | * | 6/2001 | Ernst .......................... 206/378 |
| 6,257,425 B1 | * | 7/2001 | Liu ........................ 211/90.01 |
| 6,273,255 B1 | * | 8/2001 | Rosler ........................ 206/378 |
| 6,273,277 B1 | * | 8/2001 | Geldenhuys ............. 211/70 |
| 6,299,001 B1 | * | 10/2001 | Frolov et al. ................ 211/106 |
| 6,450,338 B1 | | 9/2002 | Chen |
| 6,481,583 B1 | | 11/2002 | Black et al. |
| 6,491,267 B1 | | 12/2002 | Feldman |

\* cited by examiner

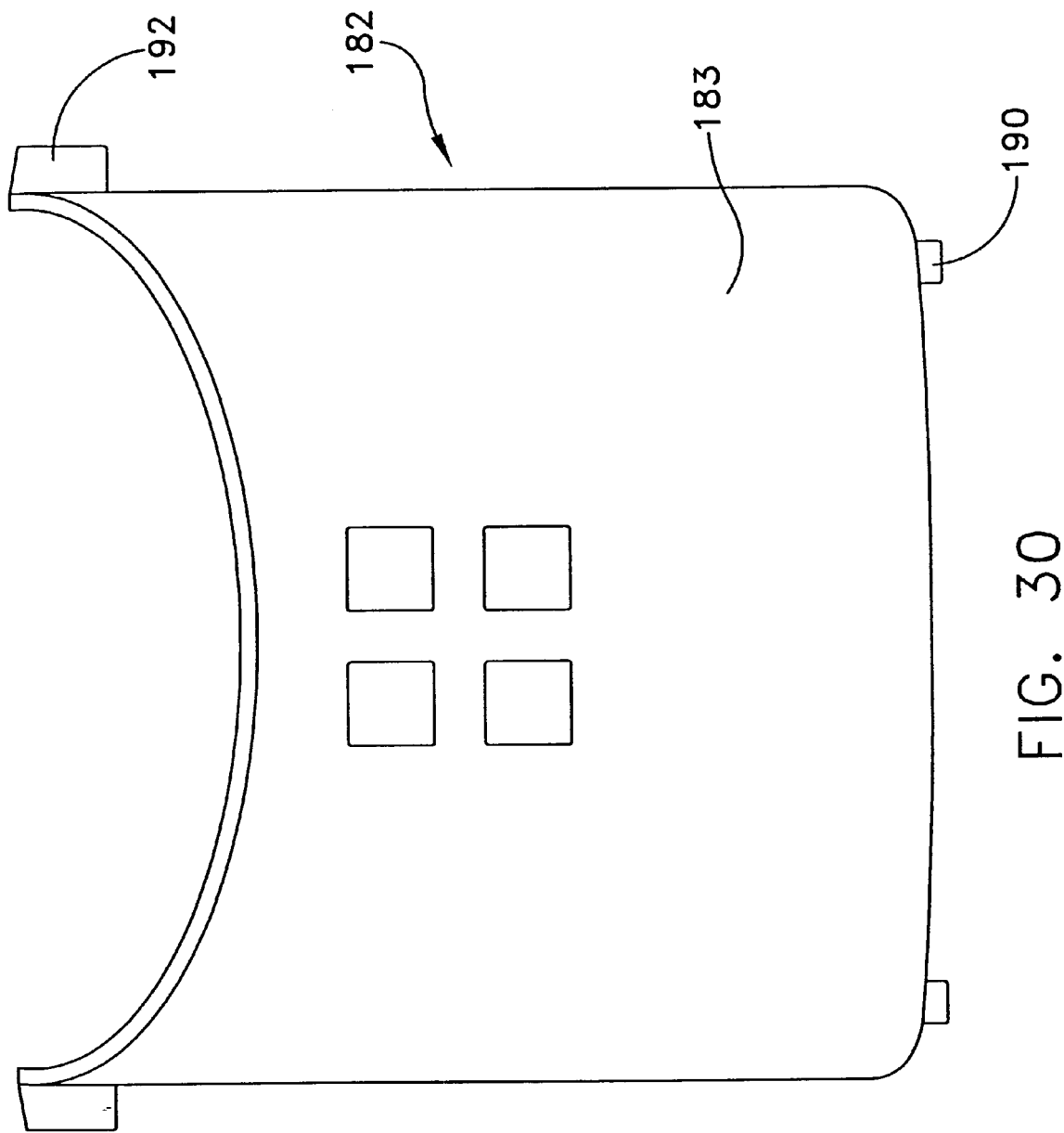

STORAGE SYSTEM

This application is a continuation application of copending U.S. application Ser. No. 10/054,835, filed on Jan. 23, 2002, now U.S. Pat. No. 6,581,788.

FIELD OF THE INVENTION

The present invention relates to storage and organizational systems and devices, and more particularly to storage and organizational systems and devices for storing home and garden tools or the like.

BACKGROUND OF THE INVENTION

In modern American suburbia, the garage has become the storage receptacle for a myriad of items that are necessary for work and recreation. The need for this storage space has become so acute that many suburban dwellings contain a 3-car garage even though the occupants own only two vehicles. Although, in many instances a recreational vehicle or boat occupies the third bay; in most cases, that extra space is utilized for storage and as a work area. Items such as sports equipment, gardening implements, and work shop related items, e.g., screwdrivers, hammers, wrenches, hand and power tools, and other implements for home, vehicle, or garden repair and maintenance are generally stored in the garage.

There are a number of systems for storing relatively small and lightweight articles known in the art. For example, pegboard or perforated panel systems are known for hanging articles in a vertical or horizontal orientation using pegboard hooks that are removably attached to a perforated panel. Shelving may also be provided on pegboards using the same or similar structures for securing and supporting the shelf to the pegboard. Prior art perforated panel systems (known as "pegboards") typically comprise a pressed composite board material with regularly spaced circular perforations into which hooks may be inserted for the storage or display of tools, instruments, and other articles. Changing the locations of the stored articles requires that the hooks or shelf-supports be removed completely from their respective supporting holes in the pegboard, and then reinserted into other holes. After a period of use, the holes tend to become worn and enlarged, and eventually become unable to retain the hooks. Also, the hooks are easily misplaced or lost. These pegboard systems are also aesthetically unattractive, especially after many years of use.

A wide variety of useful fasteners for holding items to walls are also well known in the art. When attaching items to a perforated wall or pegboard, however, the available fasteners are much fewer in number, and those that are available have many severe drawbacks. Those who use pegboards are also familiar with the frustration and irritation associated with an insecure hook. Such fasteners often pull off the pegboard and get lost or damaged, especially when only one or two items are held. The typical pegboard fastener is a straight single or double bar, usually extending from about two inches to about six inches from the pegboard. A pegboard fastener of this type usually has a pair of bent rod-like offset hooked portions at its top. These offset hooked portions are inserted into horizontally adjacent holes, by a pivoting action, to situate the top tip of the hooked portions behind the wallboard while allowing the lower part of the fastener to rest against the front surface of the wallboard.

While the use of a pair of hooked portions may inhibit rotation of the pegboard fastener, it does not avoid the frustration experienced when the pegboard fastener itself is pulled off the pegboard along with the item being removed. Those who encounter such fasteners or holders for hanging items experience frustration and irritation when attempting to remove the item from the fastener, since the bottom portion of the fastener is easily pulled away from the wall surface, i.e., there is no provision for fixing it to the pegboard.

Therefore, it would be advantageous to have a storage system which allowed ease of accessibility to tools, such as gardening implements, while maximizing the use of garage space, in an aesthetically satisfying manner. It would also be advantageous to have a storage system that could be mounted directly to the walls of a typical garage or tool shed, thereby allowing effective use of available space while removing sports equipment, gardening implements, and work shop related items from the floor space of the garage or a tool shed.

SUMMARY OF THE INVENTION

In one embodiment of the invention, a shelf and bracket assembly is provided that is to be supported upon a planar panel having a front surface, a rear surface, and a plurality of regularly shaped and spaced perforations. The shelf has two end edges and the two shelf-brackets each include a substantially circumferential flange, a receptacle portion for receiving one of the end edges of the shelf, and an upper panel catch and a lower panel catch that project outwardly from a same side of the circumferential flange in aligned spaced relation to one another. Each of the upper panel-catch and the lower panel-catch: (i) have a lock-tab projecting toward an outer surface of the circumferential flange, and (ii) are sized so as to be received within one of the plurality of regularly shaped and spaced perforations. A lock-release latch is positioned adjacent to the lower panel-catch so as to project from an end of the circumferential flange toward the lower panel-catch. Each lock-release latch comprises a cantilevered beam including a lock-release tab positioned at a free end. When each of the upper and lower panel-catches are inserted through and occupy a corresponding one of the perforations in the panel, such that each of the lock-release tabs of the lock-release latches engages the outer surface of the perforated panel thereby deflecting the lock-release latches away from the perforated panel, the shelf and brackets are moved relative to the perforated panel. This movement causes the lock-tabs to engage the rear surface of the perforated panel and the lock-release tabs of the lock-release latches to slide along the front surface and slip into the respective perforations occupied by the lower panel catches. This, in turn, allows the lock-release latches to spring-back and the lock-release tabs to enter the perforations occupied by their respective lower panel catches so as to secure the bracket in locked engagement with the perforated panel.

In another embodiment of the invention, a storage system is provided of the type including a planar panel having a plurality of regularly spaced perforations that are adapted to receive fasteners for holding items on the panel. A shelf having two end edges and being supported upon the perforated panel by two shelf-brackets is provided wherein each of the shelf-brackets comprises a substantially circumferential flange forming an outer surface, a receptacle portion for receiving one of the end edges of the shelf, and an upper panel catch and a lower panel catch projecting outwardly from a same side of the circumferential flange in aligned spaced relation to one another. Each of the upper panel-catch and the lower panel-catch have a lock-tab projecting toward the outer surface. A lock-release latch is also included that comprises a cantilevered beam including a lock-release tab positioned at a free end. The lock-release latch is positioned adjacent to at least one of the upper panel-catch and the lower panel-catch so as to project from an end of the substantially circumferential flange toward at least one of the upper panel-catch and the lower panel-catch.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein:

FIG. 29 and FIG. 30 are an item support and item receptacle, respectively, both formed so as to be mounted to the face of a perforated panel, as shown in FIGS. 1–4.

DETAILED DESCRIPTION OF THE PREFERRED EMBODIMENT

Figure 1:
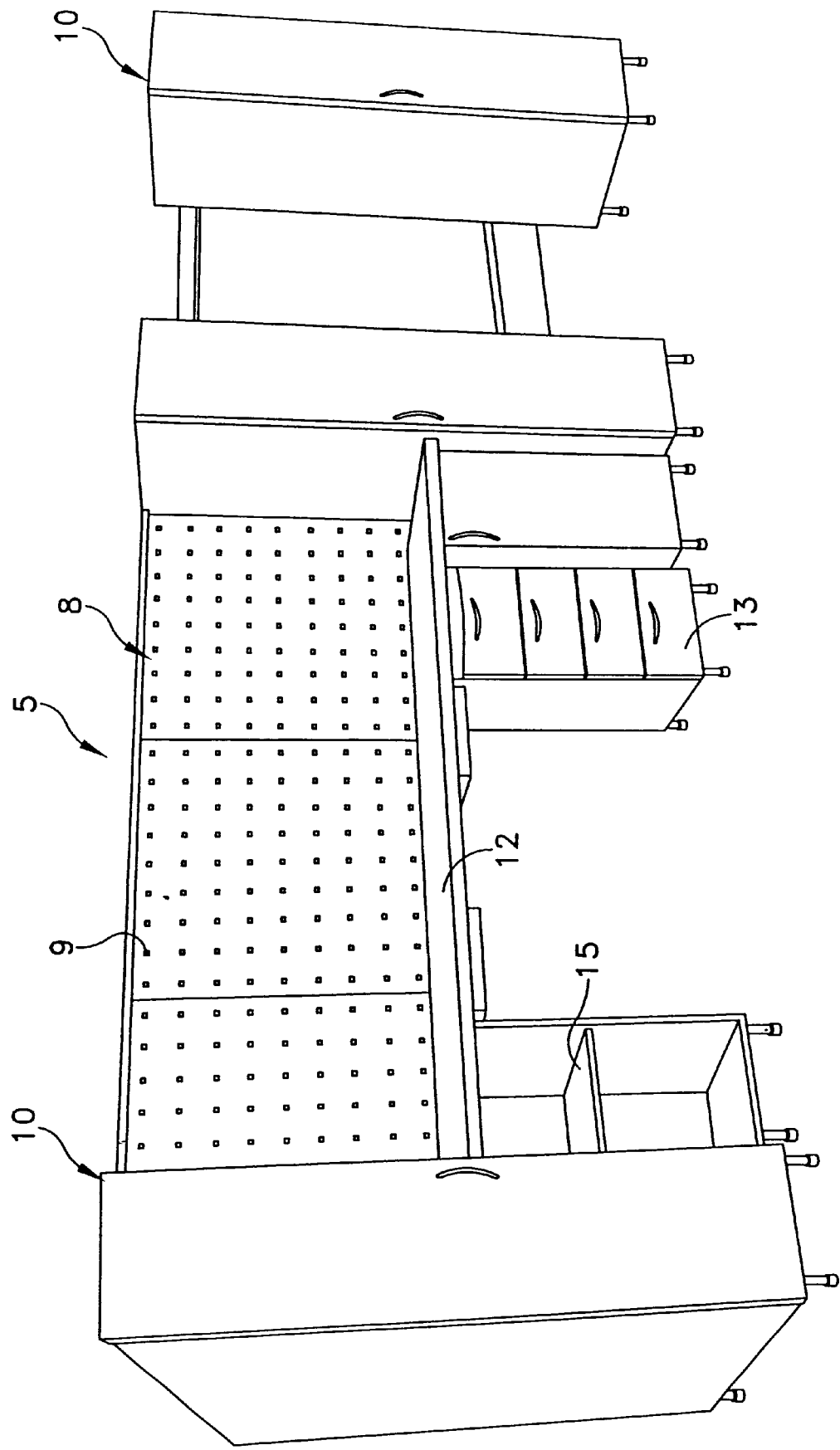
FIG. 1 is a perspective view of a storage system formed in accordance with the present invention.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses are intended to cover the structures described, suggested, or rendered obvious by the written description or drawings for performing the recited function, including not only structural equivalents but also equivalent structures.

Figure 2:
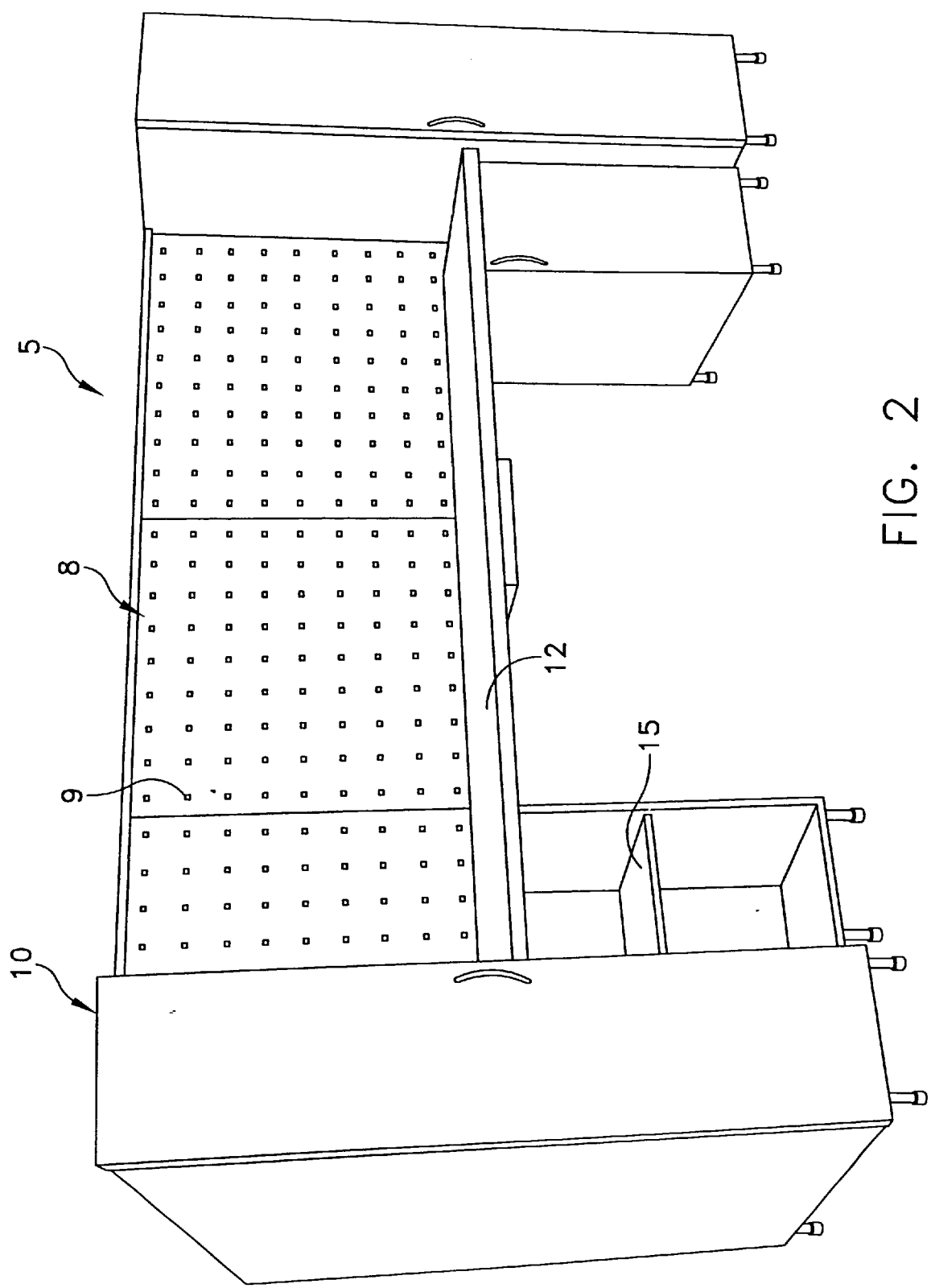
FIG. 2 is a further embodiment of the storage system shown in FIG. 1.
Figure 3:
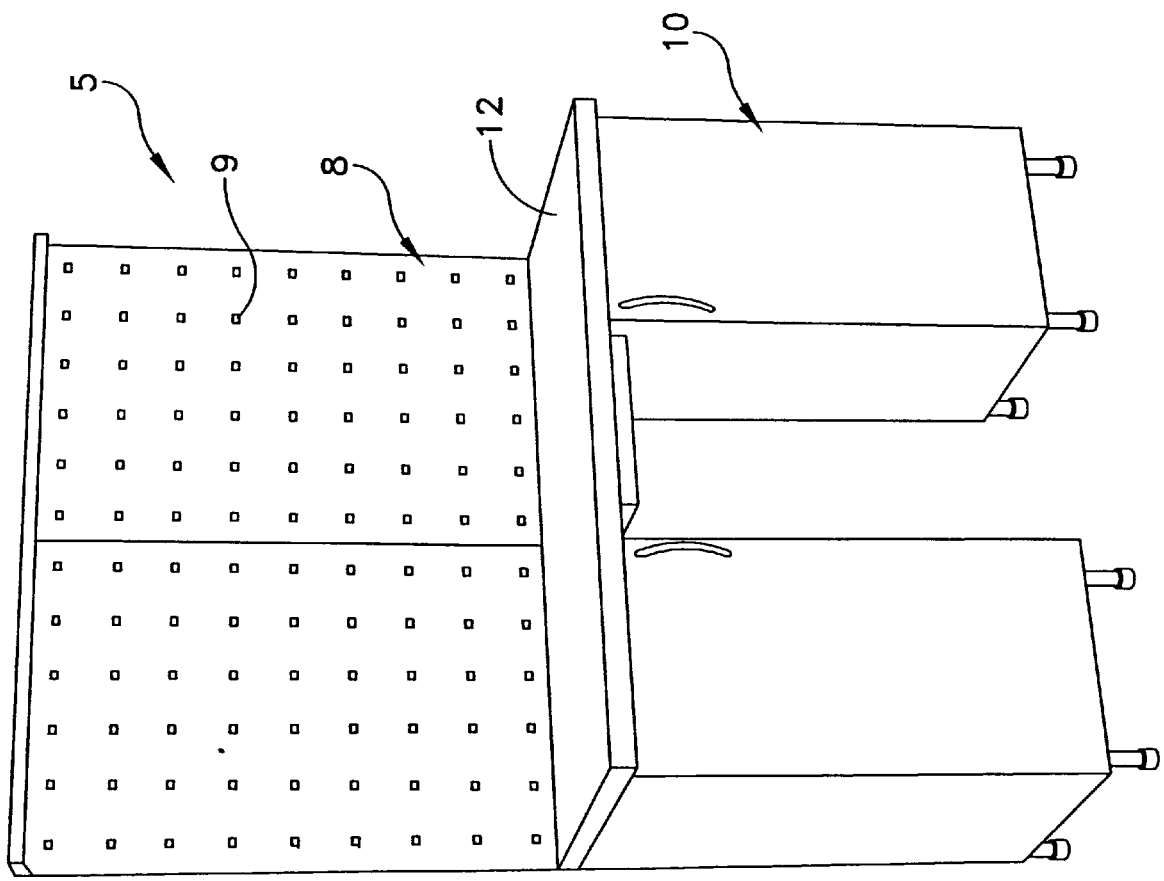
FIG. 3 is another variation of the storage system shown in FIGS. 1 and 2.

Referring to FIGS. 1–3, a new and improved storage and organization system 5 is provided comprising a perforated panel 8, storage cabinets 10, bench 12, drawers 13, and shelves 15. Storage system 5 is modular in construction such that various combinations of shelves, drawers, and cabinets may be arranged as needed or dictated by its position within a building, e.g., a residential garage, tool shed, or basement area. Storage cabinets 10, bench 12, drawers 13, and shelves 15 are typically formed of common furniture construction materials, e.g., various metals, woods, or polymers. Perforated panel 8 comprises a planer sheet of material, preferably formed of metal, and having a plurality of regularly shaped perforations 9, disposed in a regular pattern throughout the panel. Perforations 9 are each preferably formed in perforated panel 8 so as to be defined by a circumferential edge, often forming a rectangular or square opening in panel 8. Perforated panel 8 is typically about one quarter to one half of an inch thick, and in modules about two to three feet wide. Of course, it will be understood that perforated panel 8 may have various lengths and widths, depending upon the size of storage system 5. Fixtures (not shown) for providing electric, gas, or pneumatic outlets may also be positioned anywhere within storage system 5.

Referring to FIGS. 1–4, perforated panel 8 is arranged above bench 12 so that a plurality of item holders 20 may be positioned on the front surface of perforated panel 8. For convenience, in this specification, the term "item holder" will be used to represent a type of fixture that is attachable to perforated panel 8 by insertion of an element into at least one of perforations 9 and used to hold various implements, i.e., hand tools, garden tools, instruments, wires, cables, display objects (such as packages, blister display packs, vacuum display packs, loose hardware or household items, grocery items, department or variety store items, and shelves, pictures, wire frames, and the like. In one preferred embodiment, item holder 20 comprises a shelf 26 held to perforated panel 8, via shelf-brackets 30.

Figure 5:
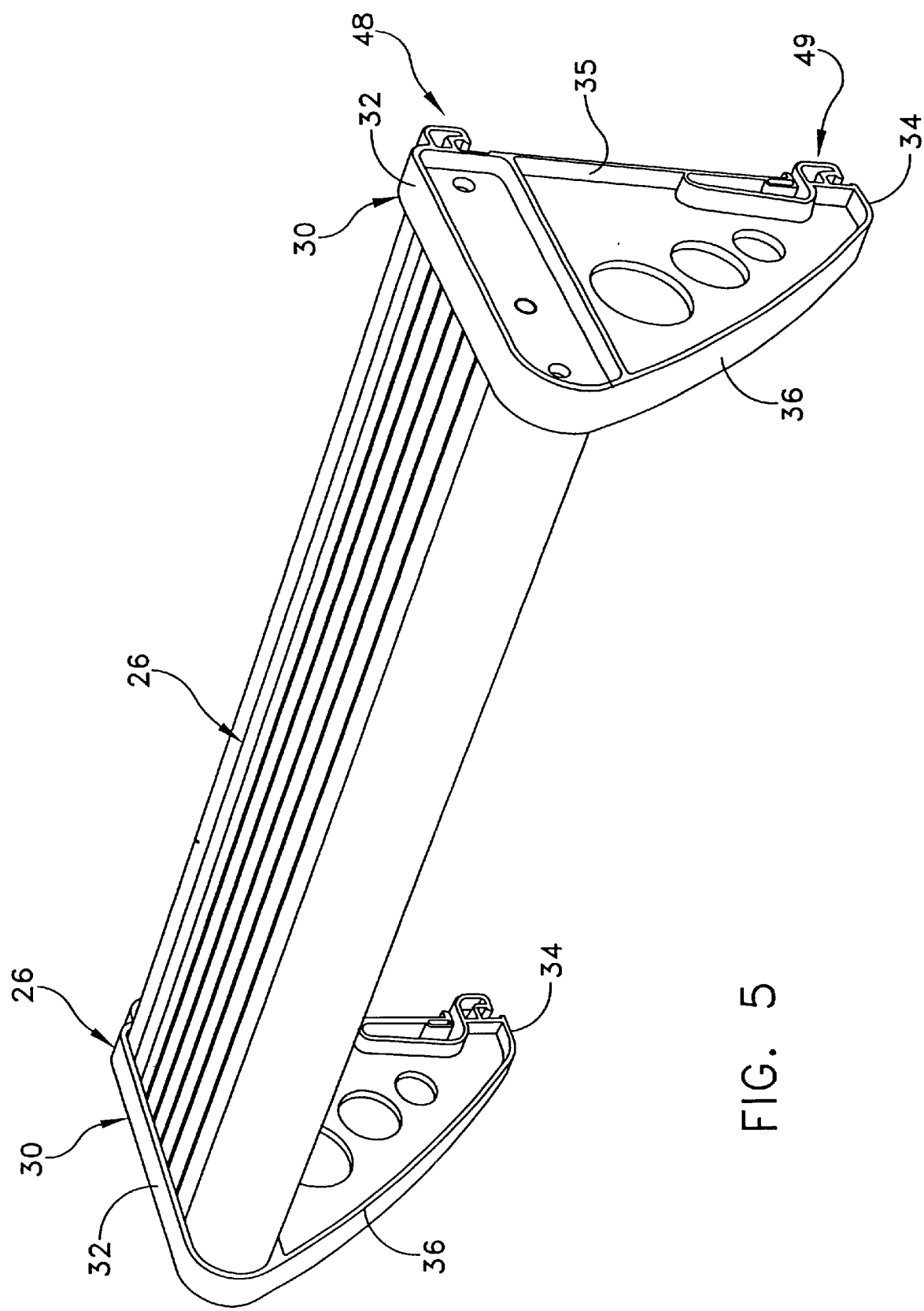
FIG. 5 is a perspective view of a novel item holder formed in accordance with the present invention.
Figure 6:
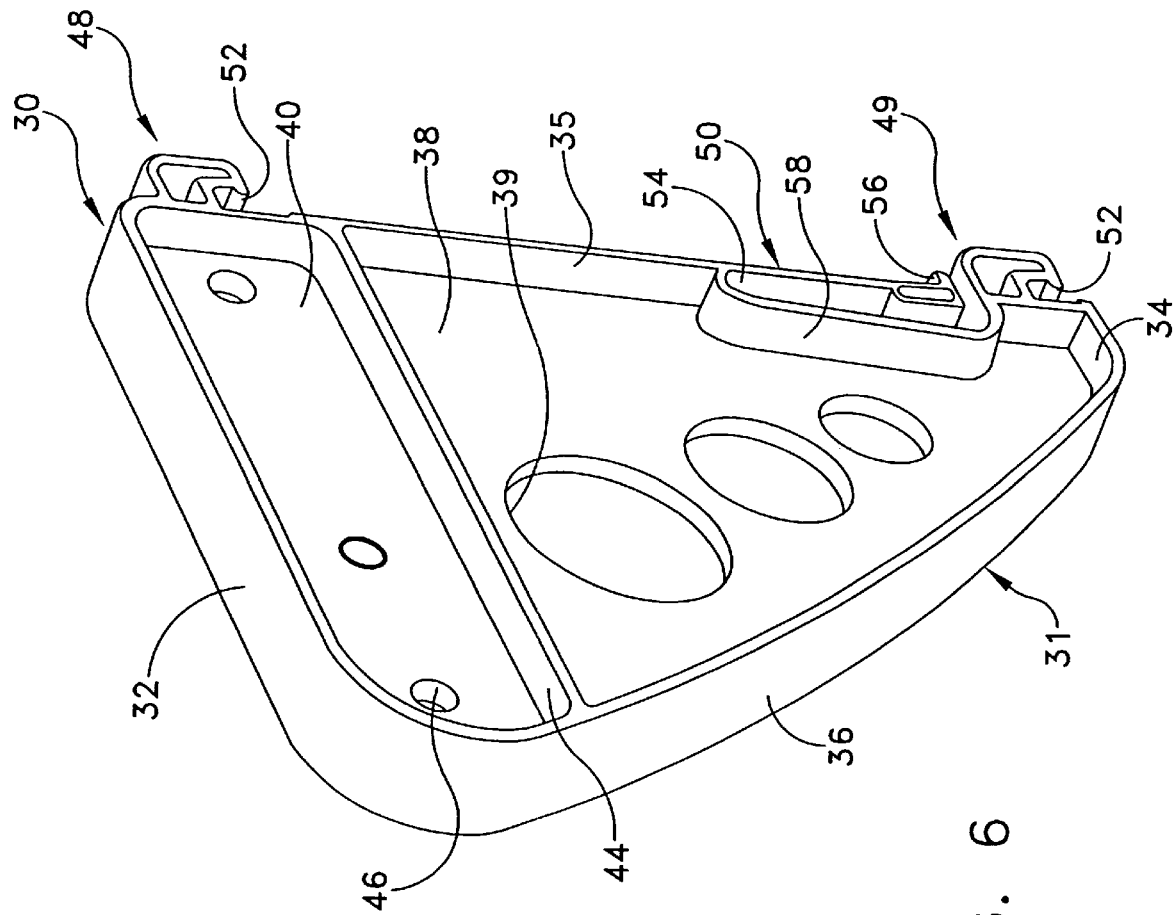
FIG. 6 is a perspective view of a shelf-bracket system formed in accordance with the present invention.

Referring to FIGS. 5 and 6, shelf-brackets 30 comprise a circumferential flange 31 having a top surface 32, an outward face 36, a bottom 34, and an inner wall 35. A lower web 38 is positioned between outward face 36, bottom 34, and inner wall 35. Shelf-brackets 30 are preferably formed from an injection moldable polymer, but may also be formed from metal or other materials as desired. A plurality of openings 39 are defined through lower web 38, often having varying diameters. An upper web 40 is positioned between top surface 32 and lower web 38. A ledge 44 projects outwardly in circumferential surrounding relation to upper web 40, thereby separating upper web 40 from lower web 38 and forming a receptacle portion for receiving an end edge of shelf 26. A plurality of holes 46 are defined through upper web 40. An upper panel-catch 48 and a lower panel-catch 49 project outwardly from the outer surface of inner wall 35. Each of upper panel-catch 48 and lower panel-catch 49 comprise a substantially "hook" shape having a lock-tab 52 projecting toward the outer surface of inner wall 35.

Adjacent to lower panel-catch 49 is a lock-release latch 50, including a lock-release cantilever 54 that projects from an end of inner wall 35. A lock-release tab 56 is positioned at the free end of lock-release cantilever 54. A recessed wall 58 is positioned in spaced relation to lock-release cantilever 54, so as to provide a recess within shelf-bracket 30 into which lock-release cantilever 54 may deflect.

Figure 7:
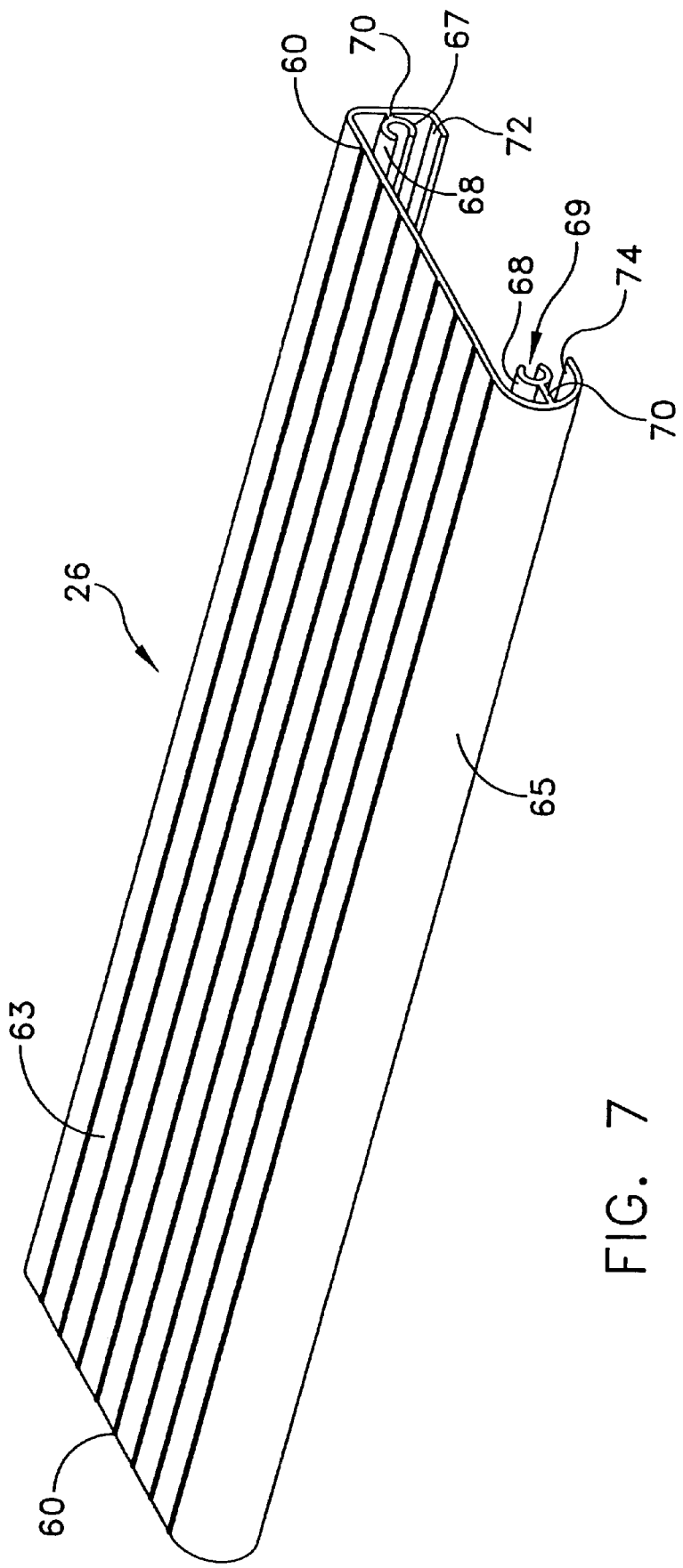
FIG. 7 is a perspective view of a shelf used in connection with the shelf-bracket of FIG. 6.
Figure 8:
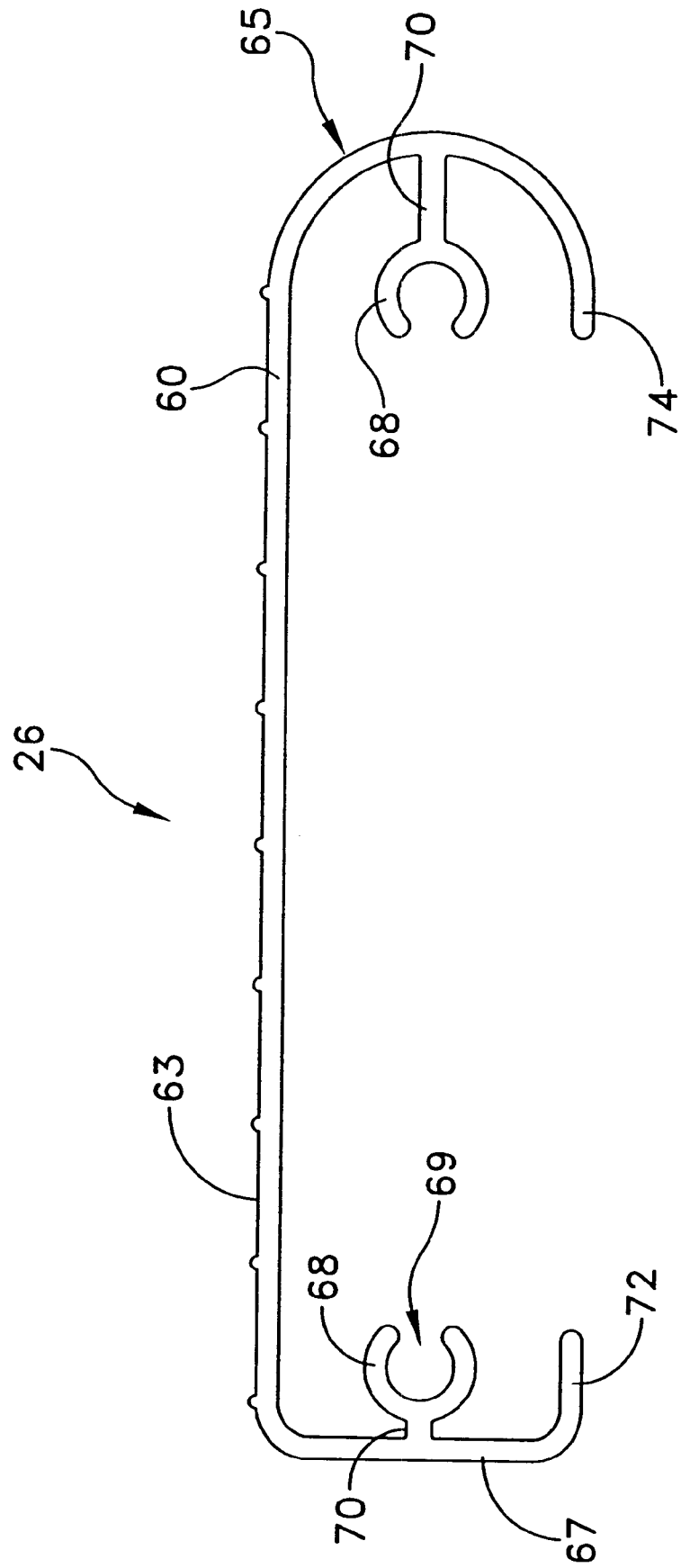
FIG. 8 is an end view of the shelf shown in FIG. 7.

Referring to FIGS. 7 and 8, shelf 26 comprises end edges 60, a top support surface 63, a nose 65, a panel flange 67, and a pair of semi-tubular receptacles 68. More particularly, shelf 26 comprises a substantially channel shape, and may be formed by extrusion of a suitable metal or polymer, e.g., aluminum or polyvinyl chloride. Top support surface 63 separates nose 65 from panel flange 67 such that each forms a longitudinal edge of shelf 26. Nose 65 and panel flange 67 are arranged in spaced parallel relation to one another. Receptacles 68 are positioned in spaced relation to the inner surfaces of nose 65 and panel flange 67, and are supported atop stems 70 so as to project inwardly. Each receptacle 68 comprises a semi-tubular cross-section defining a longitudinally extending slot 69. A rear ledge 72 is formed at the lower extremity of panel flange 67, in spaced relation to top support surface 63. A front ledge 74 is formed at the lower extremity of nose 65, and is arranged in end-on, confronting relation to ledge 72.

Figure 9:
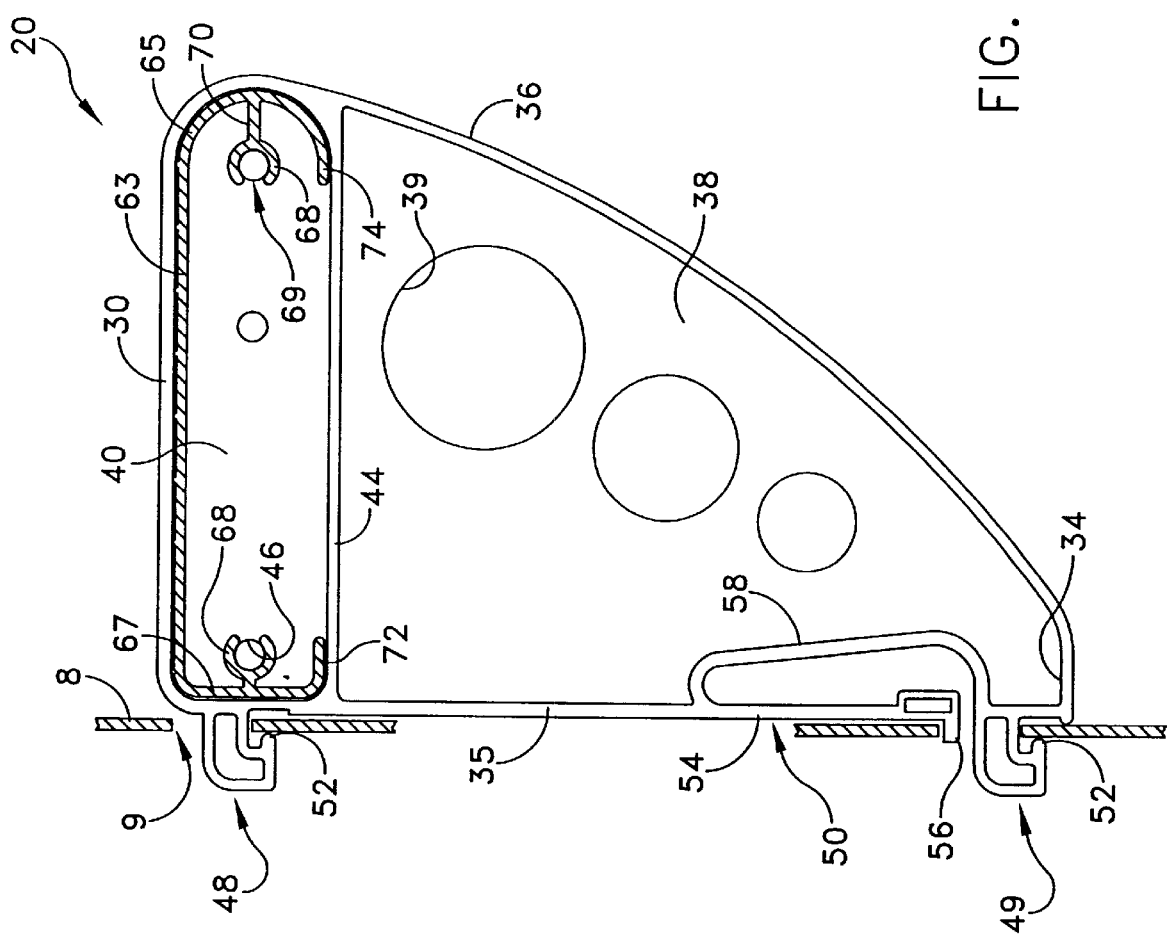
FIG. 9 is an end view of the shelf and bracket shown in FIG. 5, as assembled to a perforated panel of the present invention.

Referring to FIG. 9, item holder 20 is assembled to perforated panel 8 in the following manner. A shelf-bracket 30 is positioned on each end of shelf 26 so that upper web 40 is disposed in aligned confronting relation to an end edge 60 of shelf 26. In this position, face 36 of each shelf-bracket 30 extends downwardly from nose 65 of shelf 26. Each shelf-bracket 30 is then moved toward its respective end edge 60, until shelf 26 engages upper web 40. In this position, panel ledge 72 and front ledge 74 are positioned in supporting and engaged relation to ledge 44 of shelf-bracket 30. Once assembled, screws (not shown) may be inserted through holes 46 in upper web 40 and into receptacle 68 so as to retain shelf-brackets 30 to shelf 26.

Once item holder 20 is fully assembled, it may be positioned anywhere on perforated panel 8 in the following manner. Each panel-catch 48,49 of each shelf-bracket 30 is positioned in coaxial aligned relation with a corresponding set of four perforations 9 in perforated panel 8. In this position, lock-release tab 56 is positioned in confronting relation to the front surface of perforated panel 8, directly above the perforation 9 with which its corresponding lower panel-catch 49 is aligned. Once in this position, item holder 20 is moved toward perforated panel 8 until upper panel-catches 48 enter, pass through, and occupy their respective perforation 9. As this occurs, lower panel-catches 49 enter, pass through, and occupy their respective perforations 9. At the same time, lock-release tab 56 engages the front surface of perforated panel 8 directly adjacent to the perforation 9 that is occupied by lower panel-catch 49.

Once in this position, item holder 20 is moved toward perforated panel 8 until the outer surface of inner wall 35 engages the outer surface of perforated panel 8. In this position, panel-catches 48 and 49 are fully inserted within perforations 9, and lock-release latch 50 is deflected inwardly, toward recessed wall 58 of shelf-bracket 30. Item holder 20 is then moved downwardly, so that lock-tabs 52 move across the edge of perforated panel 8 that defines perforation 9, and into engagement with the rear surface of perforated panel 8 (as shown in FIG. 9). As this occurs, lock-release tab 56 of lock-release latch 50 slides along the front surface of perforated panel 8, and across the peripheral edge of perforation 9 into which lower panel-catch 49 has been previously inserted. As this occurs, lock-release cantilever 54 is released so as to move outwardly, away from recessed wall 58, such that lock-release tab 56 slides along the edge of perforated panel 8 that defines perforation 9, so as to secure shelf-bracket 30 in locked engagement with perforated panel 8. In order to remove item holder 20, it is necessary only to deflect lock-release cantilever 54 inwardly, toward recessed wall 58 and move item holder 20 upwardly relative to perforated panel 8. In this way, when lock-release tabs 56 disengage from their respective perforations 9, both shelf-brackets 30 may be slid outwardly, disengaging lock tabs 52, so that item holder 20 may be pulled from its position on perforated panel 8.

Figure 10:
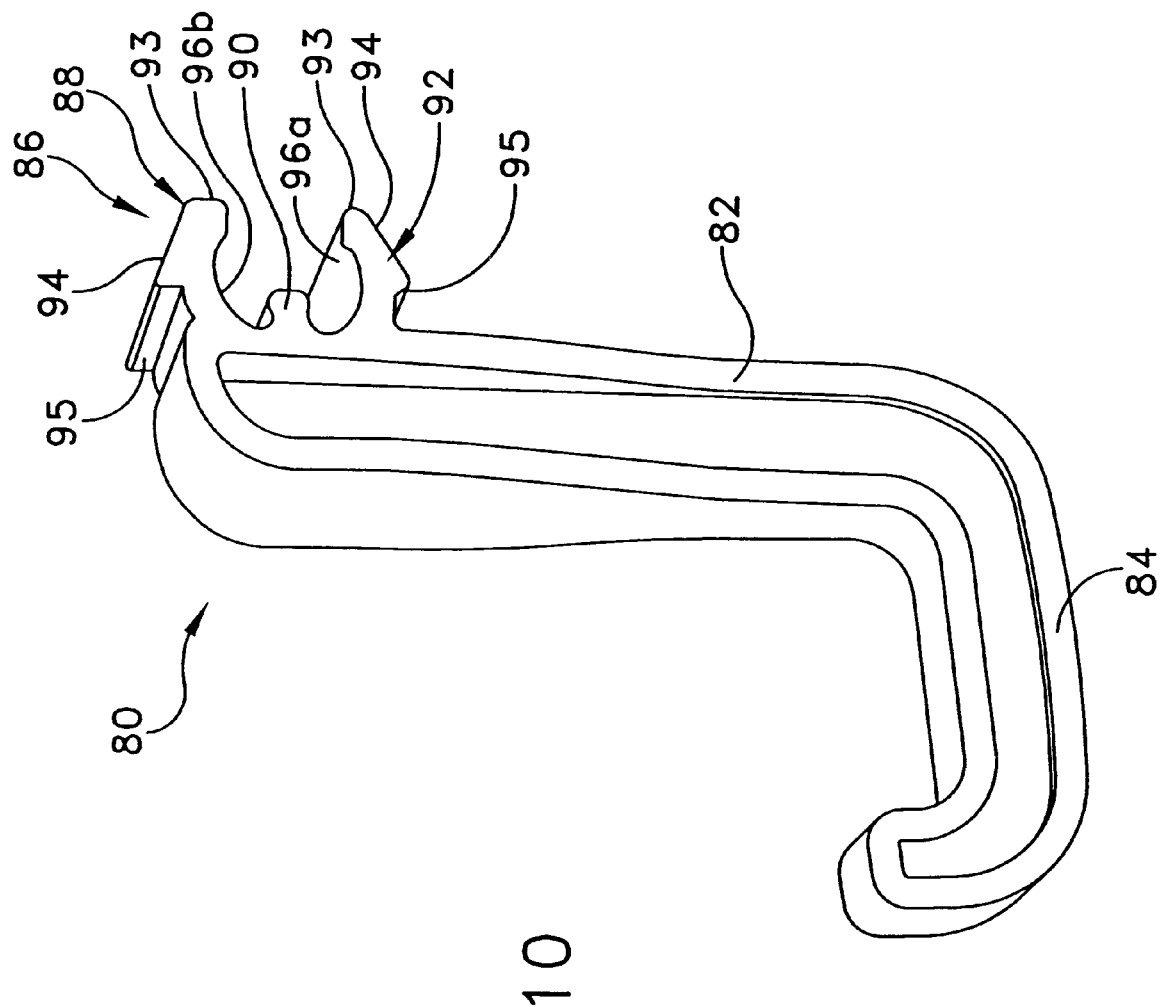
FIG. 10 is a novel hook adapted for mounting on a perforated panel in accordance with the present invention.
Figure 11:
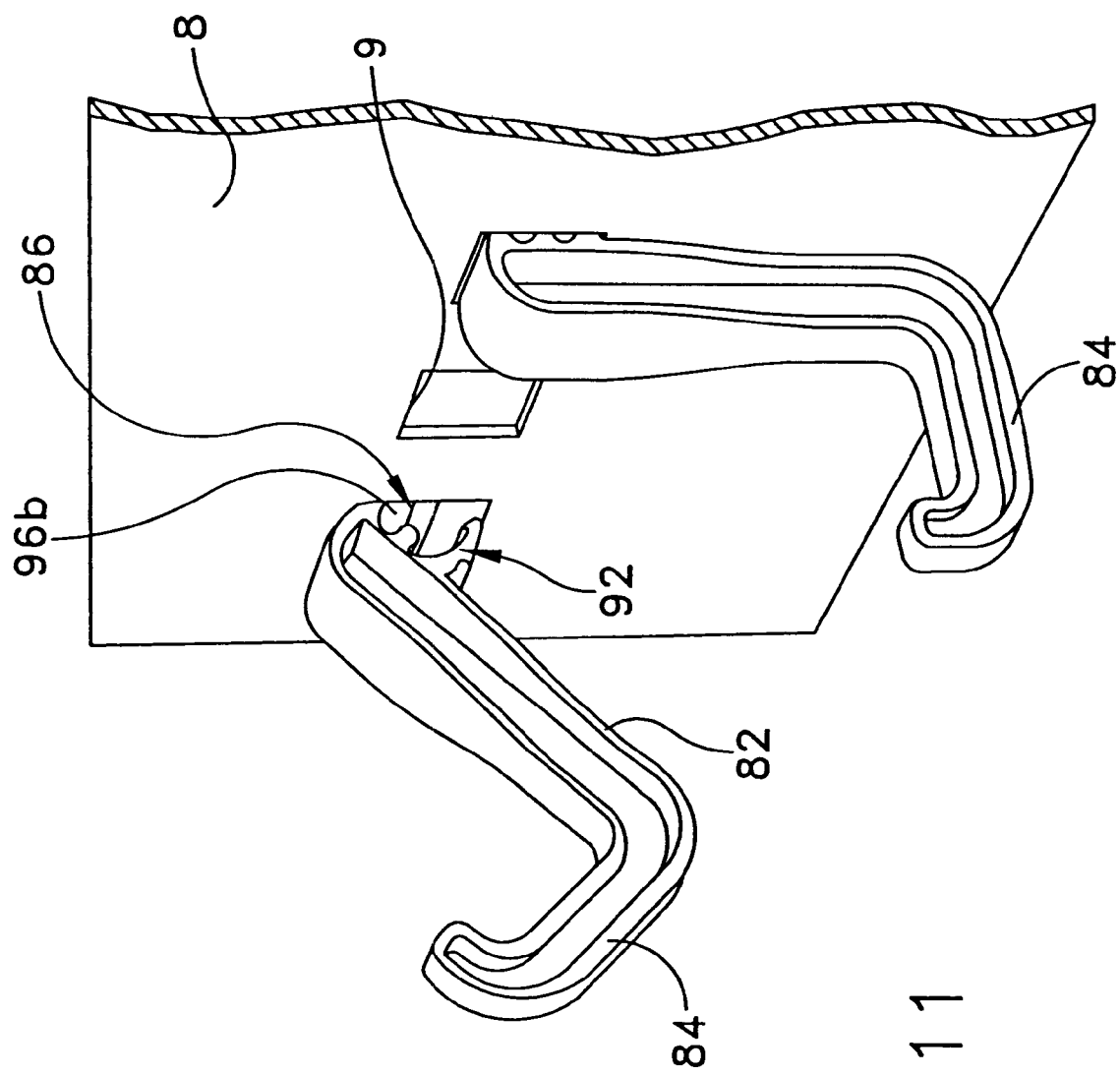
FIG. 11 is a perspective view of two hooks being inserted into a portion of a perforated panel in accordance with the present invention.

Item holder 20 may be used as a conventional shelf with various items being placed on top support surface 63. However, items may also be held beneath shelf 26, so as to advantageously store additional items. Referring to FIGS. 10 and 11, a shelf hook 80 comprises a shank 82, a support arm 84, and a catch 86. More particularly, shank 82 and support arm 84 form a conventional hook of the type known for hanging tools and other items. Catch 86 comprises an upper cantilevered latch 88, a stabilizer tab 90, and a lower cantilevered latch 92. Upper cantilevered latch 88 and lower cantilevered latch 92 project outwardly from an upper portion of shank 82 and comprise a nose 93, a ramp 94, and a shoulder 95. Upper cantilevered latch 88 and lower cantilevered latch 92 have a slightly curved profile defining opposed inner curved surfaces 96a and 96b, with stabilizer tab 90 projecting outwardly from shank 82 and positioned between inner surfaces 96a and 96b.

Hook 80 may be assembled to any perforation 9 within perforated panel 8, as shown in FIG. 11. More particularly, hook 80 is arranged adjacent to perforated panel 8, such that support arm 84 is directed away from the outer surface of perforated panel 8. In this position, catch 86 is arranged in coaxial aligned relation to a perforation 9. Hook 80 is then pivoted such that support arm 84 moves away from perforated panel 8, thereby sliding ramp 94 along the upper edge of its respective perforation 9, until shoulder 95 slips behind that upper edge. Once in this position, hook 80 is reversely pivoted such that support arm 84 and shank 82 move toward perforated panel 8. As this occurs, the lower edge of perforated panel 8 that defines perforation 9 engages ramp 94 of lower cantilevered latch 92 and deflects lower cantilevered latch 92 toward upper cantilevered latch 88. As support arm 84 and shank 82 of hook 80 continue their movement toward perforated panel 8, shoulder 95 of lower cantilevered latch 92 slips past the lower edge of perforated panel 8 that defines perforation 9, thus releasing lower cantilevered latch 92 to spring back to its original position, and thereby locking hook 80 to perforated panel 8. In order to remove hook 80 from perforated panel 8, it is only necessary to pivot hook 80 outwardly about catch 86 until shoulder 95 of lower cantilevered latch 92 slips past the lower edge of perforated panel 8 that defines perforation 9, so as to deflect lower cantilevered latch 92 and thereby release hook 80.

Figure 12:
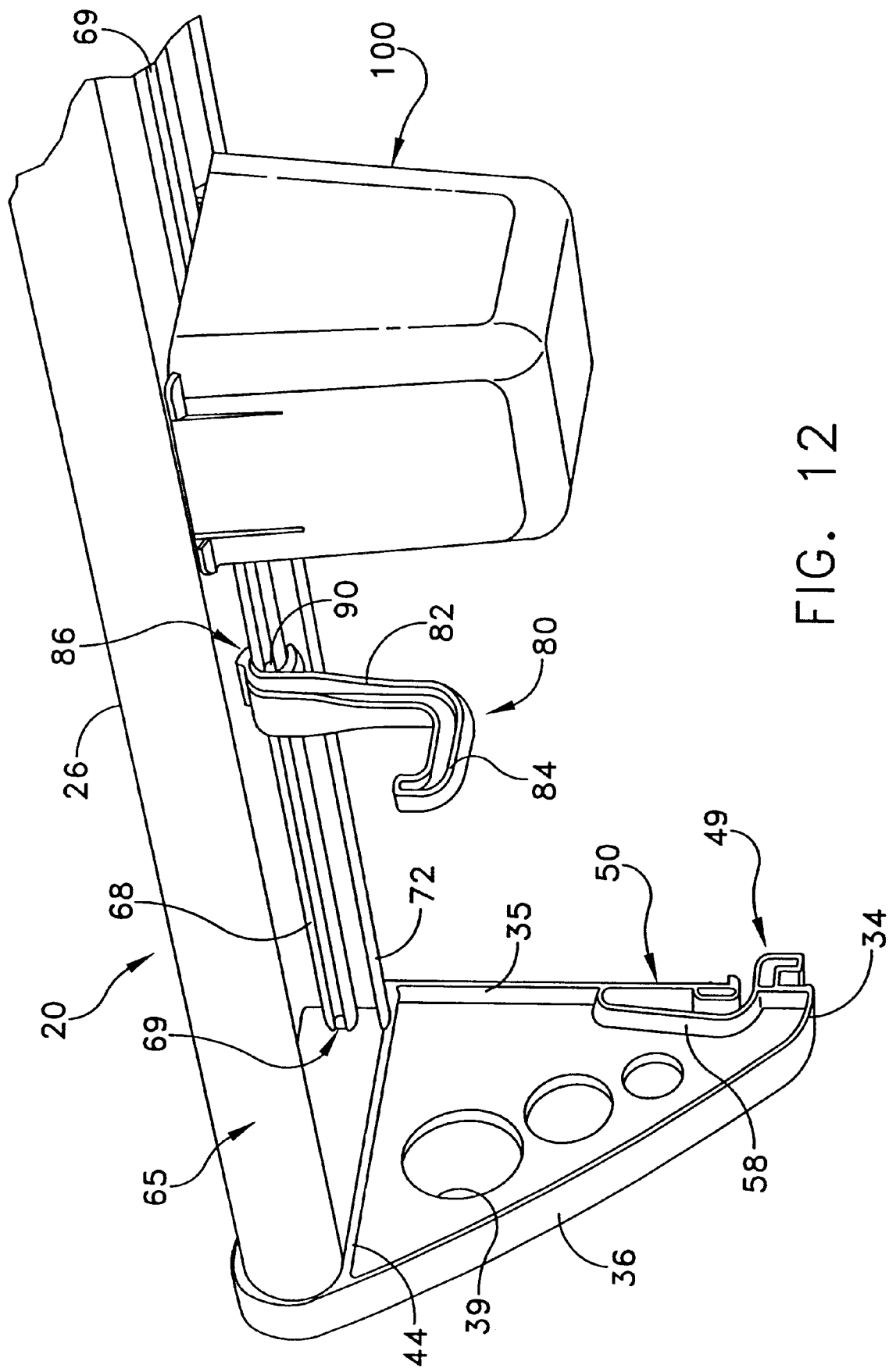
FIG. 12 is a partially broken-away, perspective view of a shelf and shelf-bracket system assembled in accordance with the present invention, and having a hook and container assembled to an interior structure.
Figure 13:
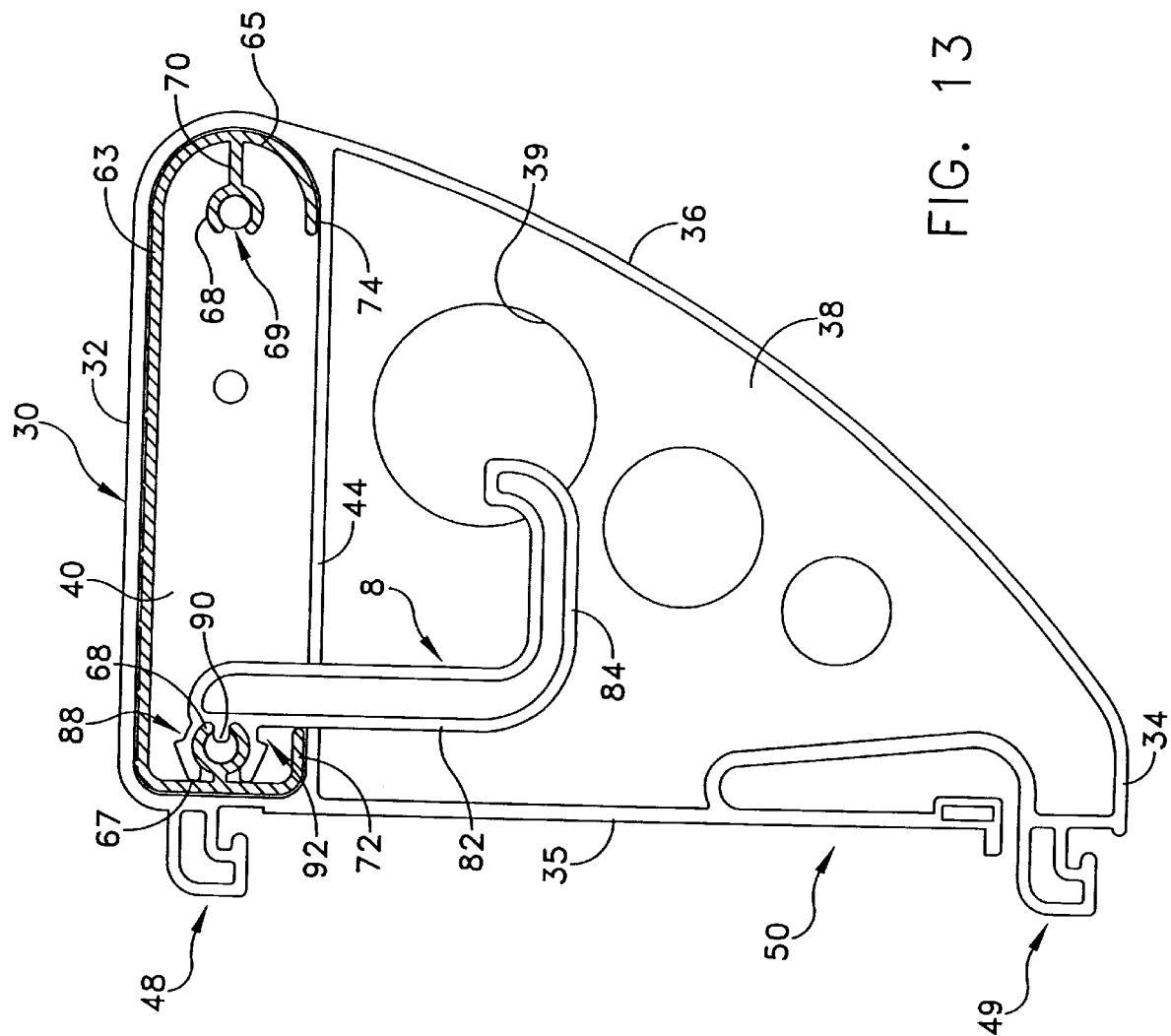
FIG. 13 is an end view of the shelf, bracket, and hook assembly shown in FIG. 12.
Figure 14:
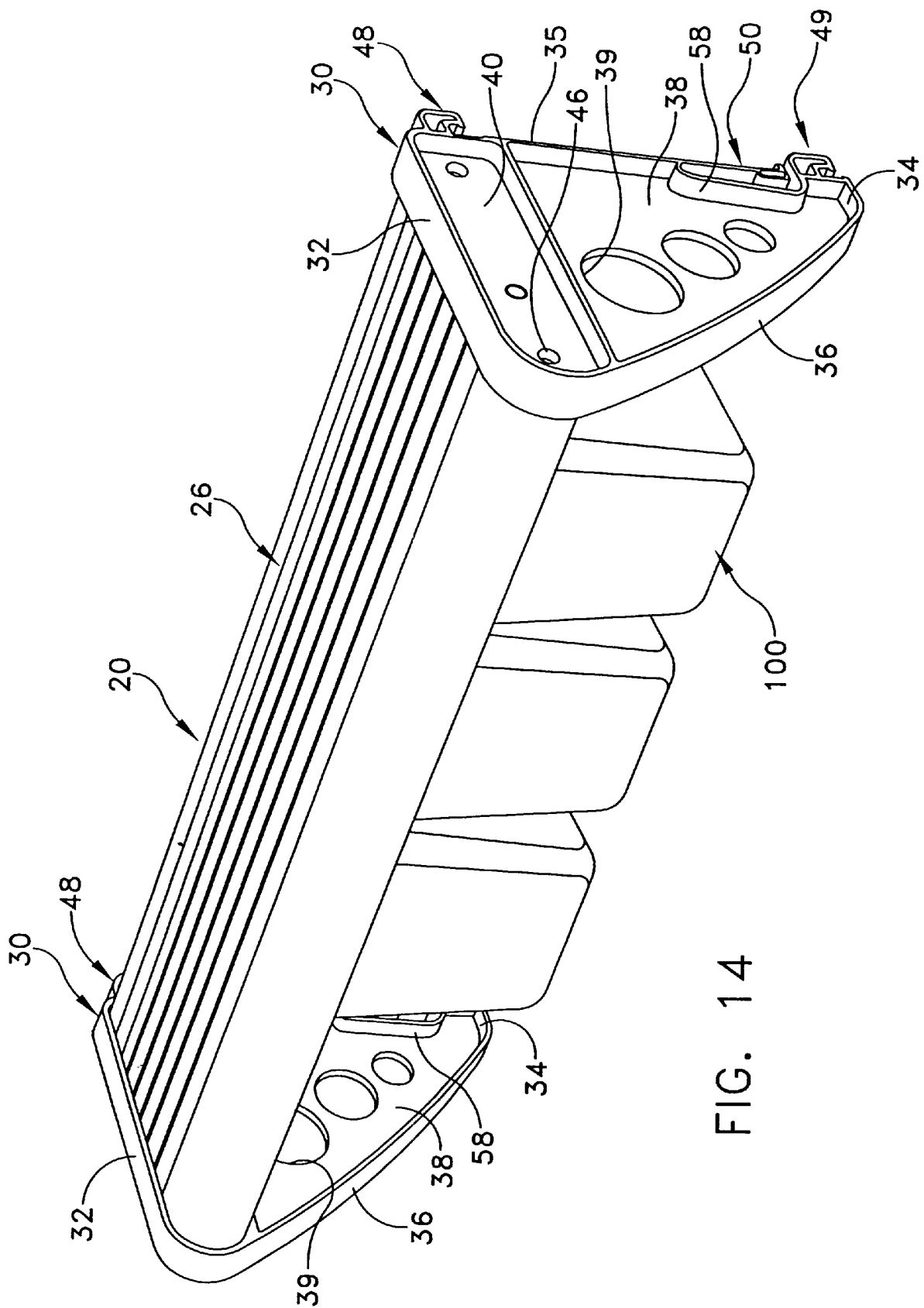
FIG. 14 is a perspective view of the item holder shown in FIG. 4, having a plurality of containers assembled to its underside.
Figure 15:
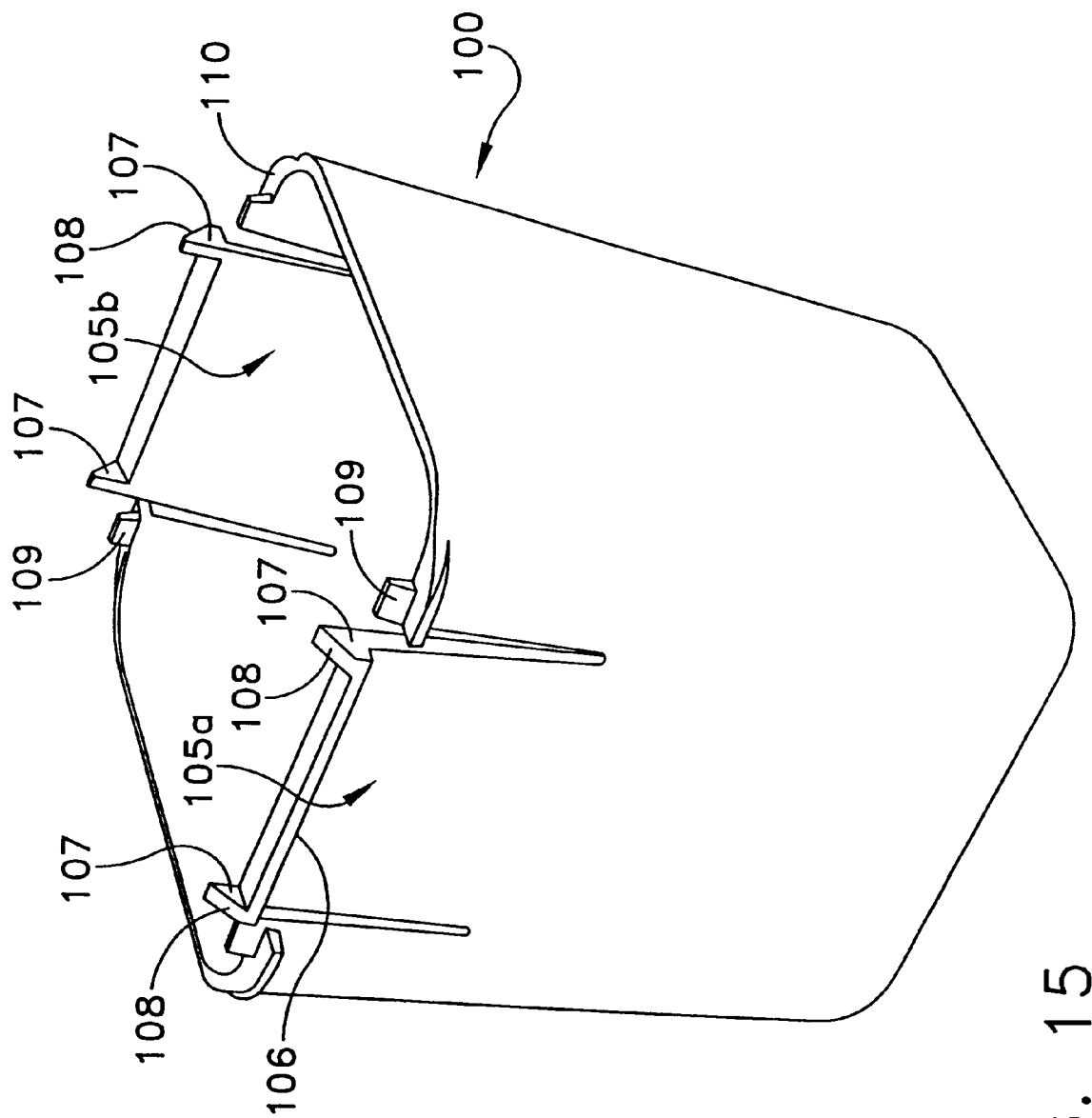
FIG. 15 is a perspective view of one of the containers shown in FIG. 14.
Figure 16:
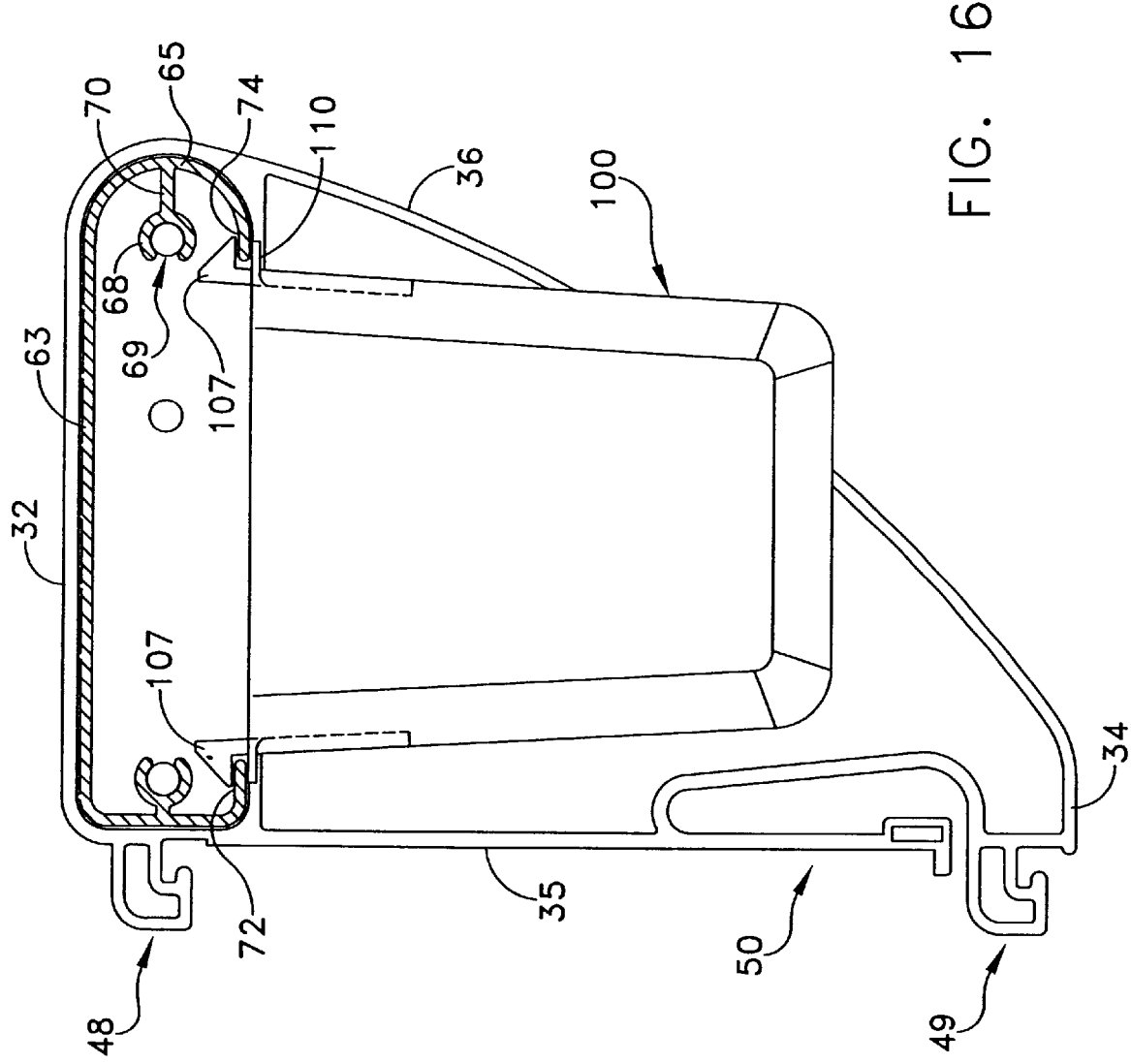
FIG. 16 is an end view of the shelf, self-bracket and container assembly shown in FIG. 14.

Referring to FIGS. 12 and 13, hook 80 may also be assembled to receptacles 68 within nose 65 or panel flange 67 in the following manner. Catch 86 is positioned so that stabilizer tab 90 is positioned in confronting relation to slot 69 of receptacle 68. Once in this position, hook 80 is moved toward receptacle 68 so that each nose 93 of upper and lower cantilevered latches 88,92 engage receptacle 68. As this occurs, upper and lower cantilevered latches 88,92 deflect away from one another such that receptacle 68 slips between them and into engagement with inner curved surfaces 96a, 96b. In this position, stabilizer tab 90 is positioned within slot 69 of receptacle 68. Hook 80 is then free to slide along receptacle 68 to any desired position.

Referring to FIGS. 12, 14, 15, and 16, a container 100 may also be positioned on the underside of item holder 20. More particularly, container 100 comprises an open-ended receptacle having a front cantilevered latch 105a and a rear cantilevered latch 105b. Each cantilevered latch 105a,105b comprises a shoulder 106, and a pair of spaced apart cam ears 107. Each cam ear 107 also includes a front ramp 108. Adjacent to each cam ear 107, on container 100 are upwardly projecting stops 109. In order to assemble container 100 to item holder 20, container 100 is positioned below shelf 26 such that cantilevered latches 105a,105b are disposed in confronting relation to panel ledge 72 and front ledge 74 of shelf 26. Once in this position, container 100 is moved toward the underside of shelf 26, until each front ramp 108 of each cam ear 107 engages and slides along the edge of its respective panel ledge 72 and front ledge 74. As this occurs, cantilevered latches 105a,105b deflect inwardly until cam ear 107 clears its respective panel ledge 72 or front ledge 74. Once in this position, cantilevered latches 105a, 105b spring outwardly, such that shoulders 106 slip over panel ledge 72 and front ledge 74, respectively, to latch container 100 in place under shelf 26. Stops 109 are positioned on container 100 so as to slip between top edge 110 of the container and panel ledge 72 and front ledge 74 to help stabilize container 100 when it is attached to shelf 26. In order to remove container 100, one of cantilevered latches 105a,105b is depressed inwardly so as to release shoulders 106 from engagement with front ledge 74, thereby releasing container 100.

Figure 17:
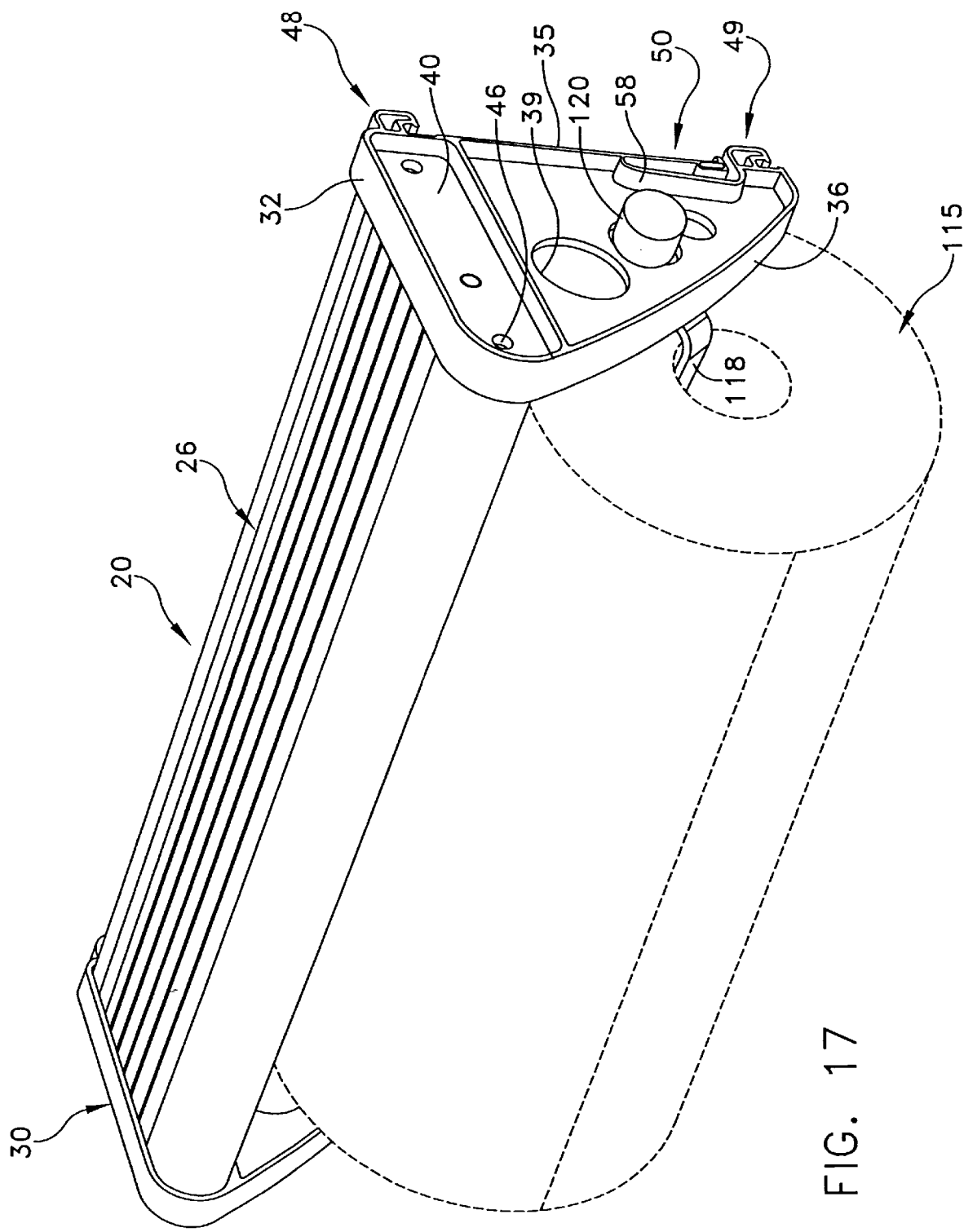
FIG. 17 is a perspective view of the item holder shown in FIG. 4, having a roll of material supported under the shelf and by the two shelf-brackets.
Figure 18:
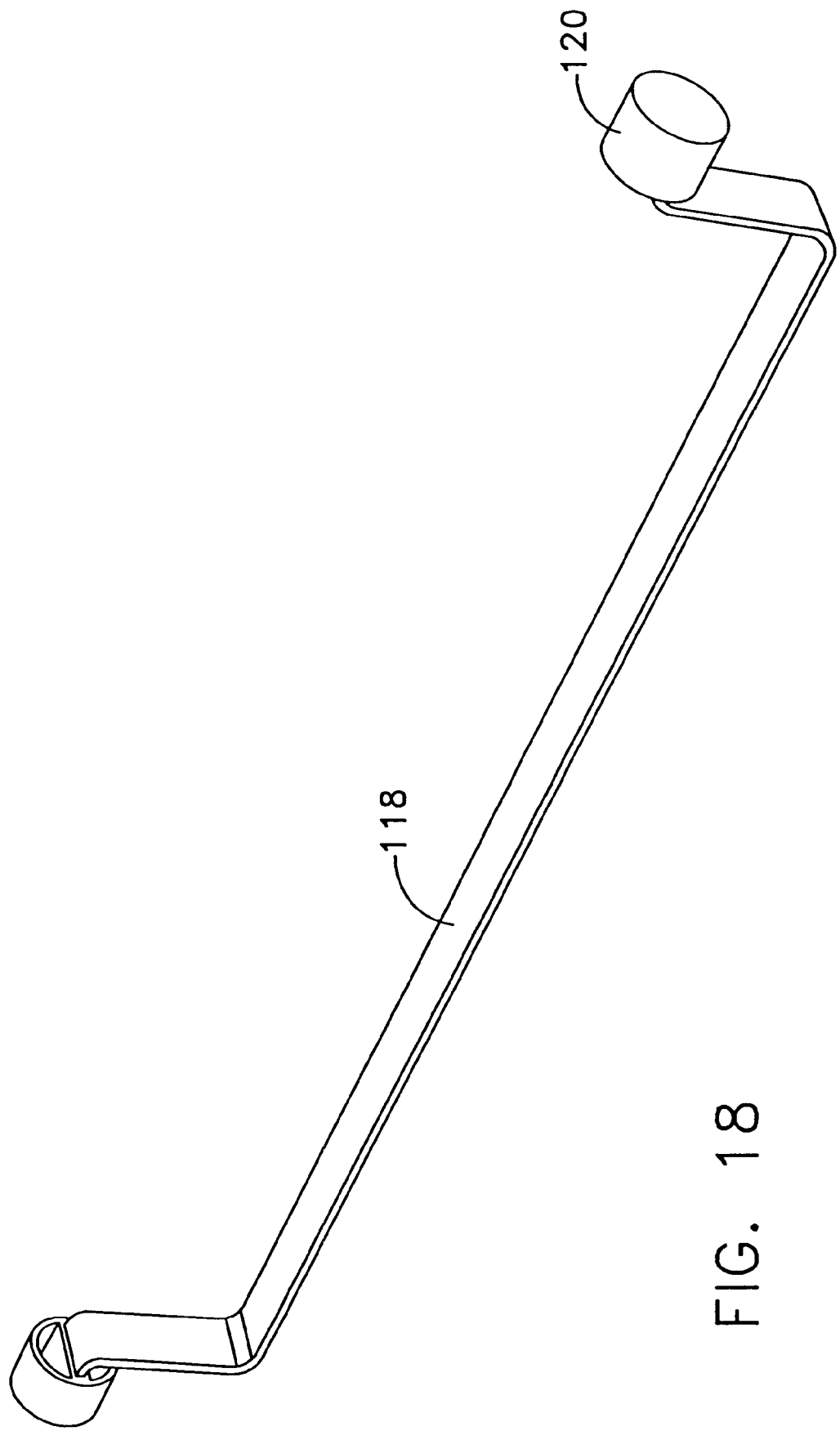
FIG. 18 is a support rod used to support a roll of material as shown in FIG. 17.
Figure 19:
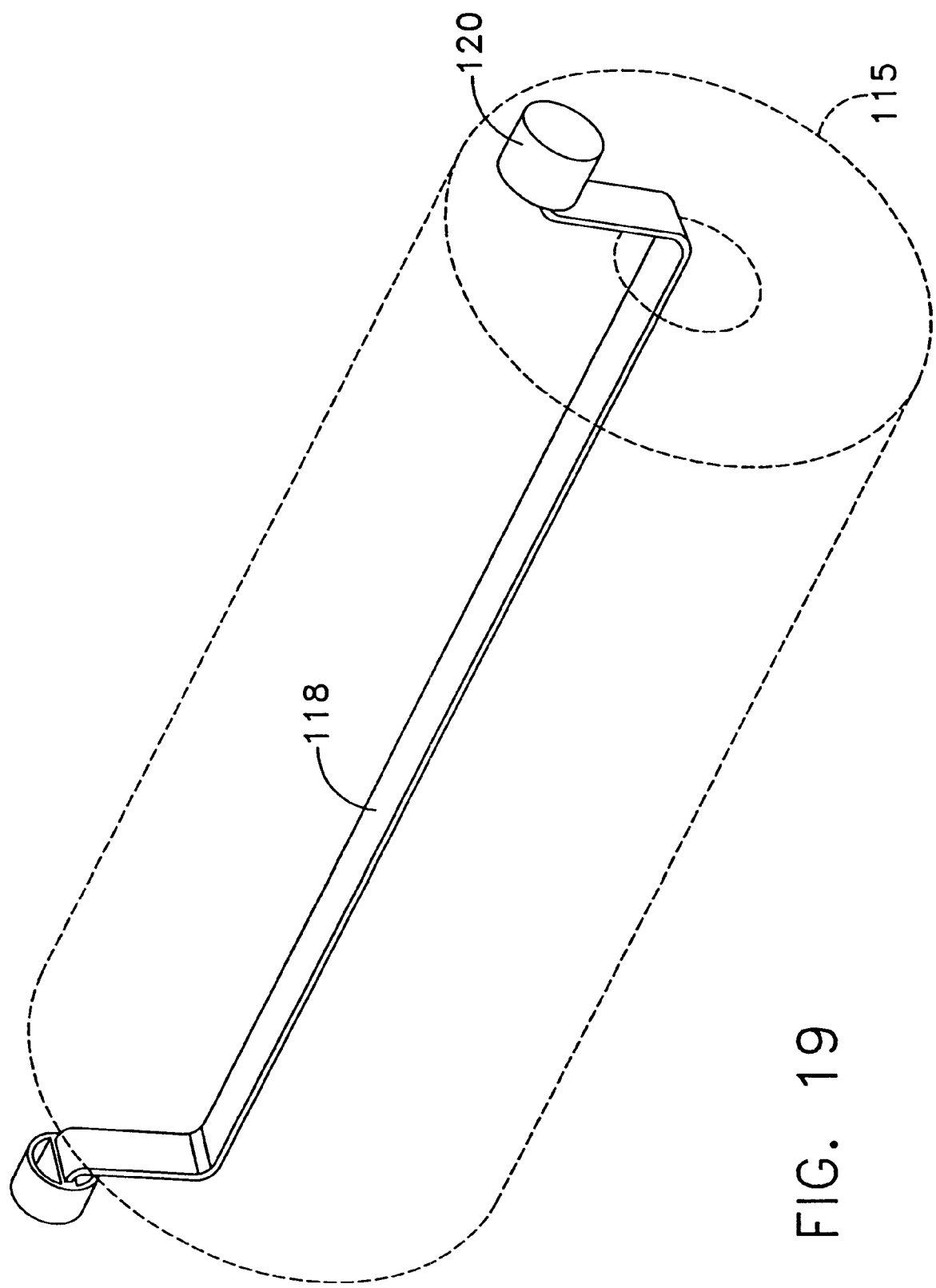
FIG. 19 is a perspective view, partially in phantom, of the rod and roll shown in FIG. 17, with the shelf and brackets removed for clarity of illustration.
Figure 20:
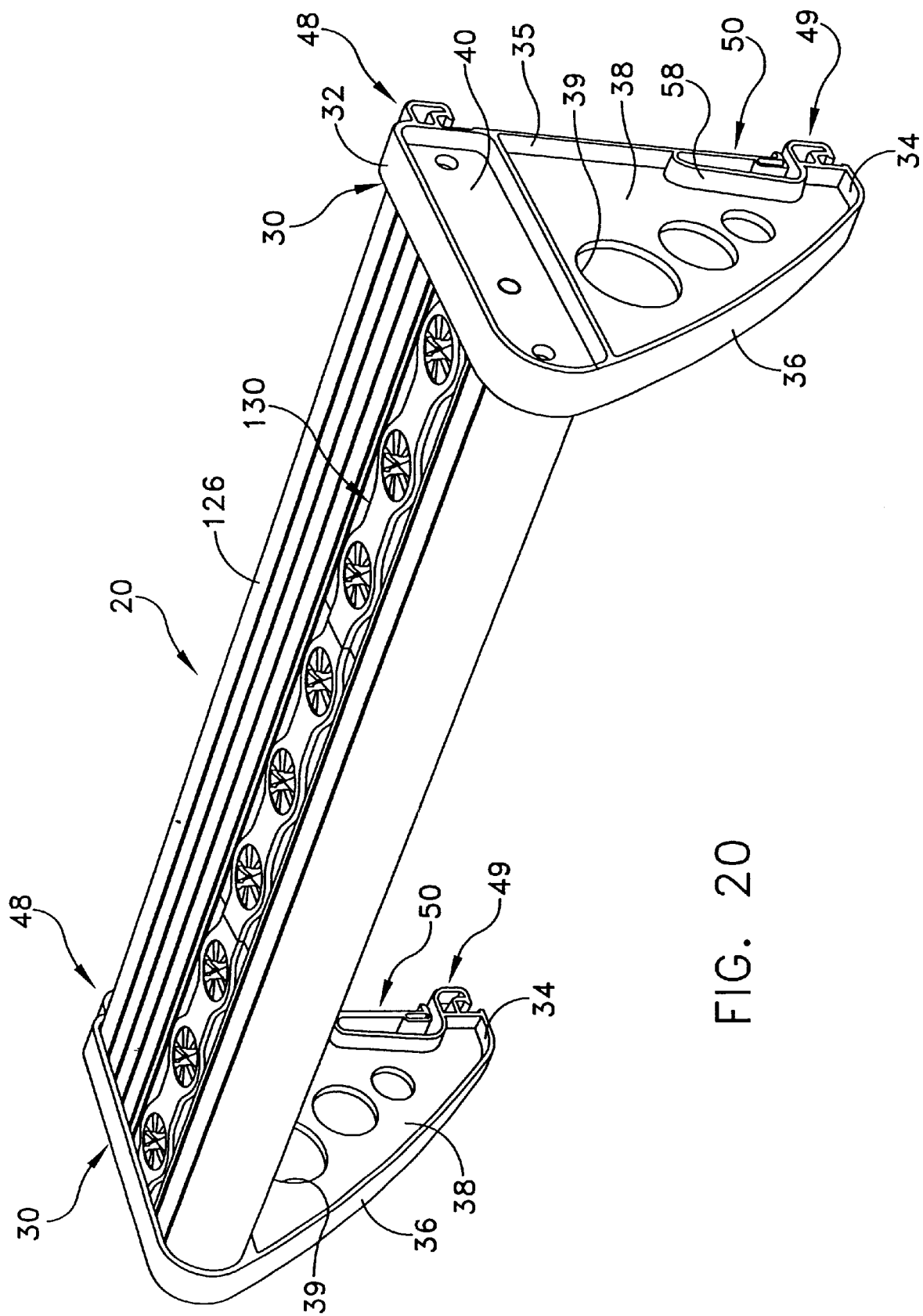
FIG. 20 shows another embodiment of the item holder shown in FIG. 4, and having a tool holder formed within the shelf.
Figure 21:
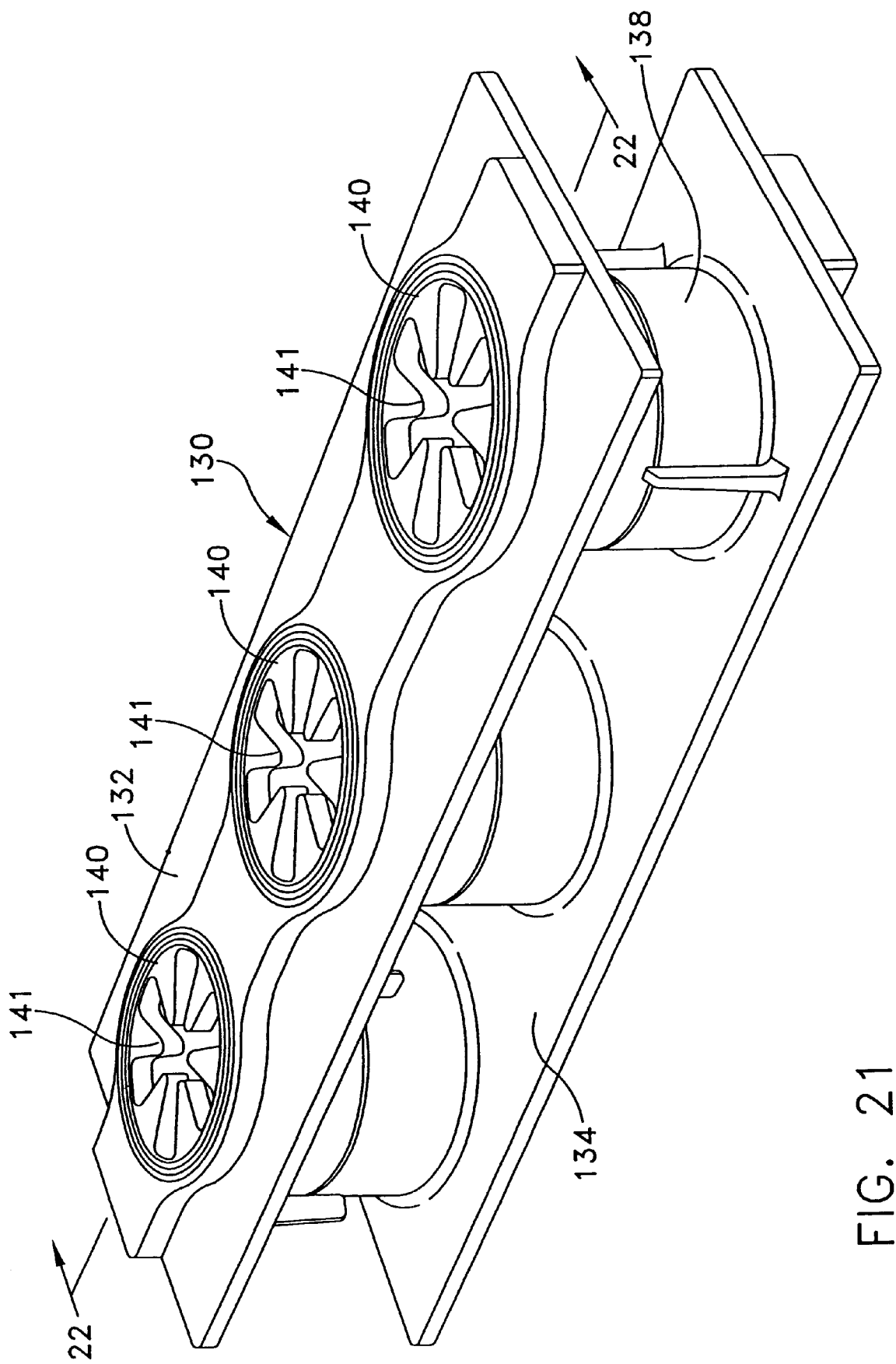
FIG. 21 is a perspective view of a tool holder of the type shown in FIG. 20.
Figure 22:
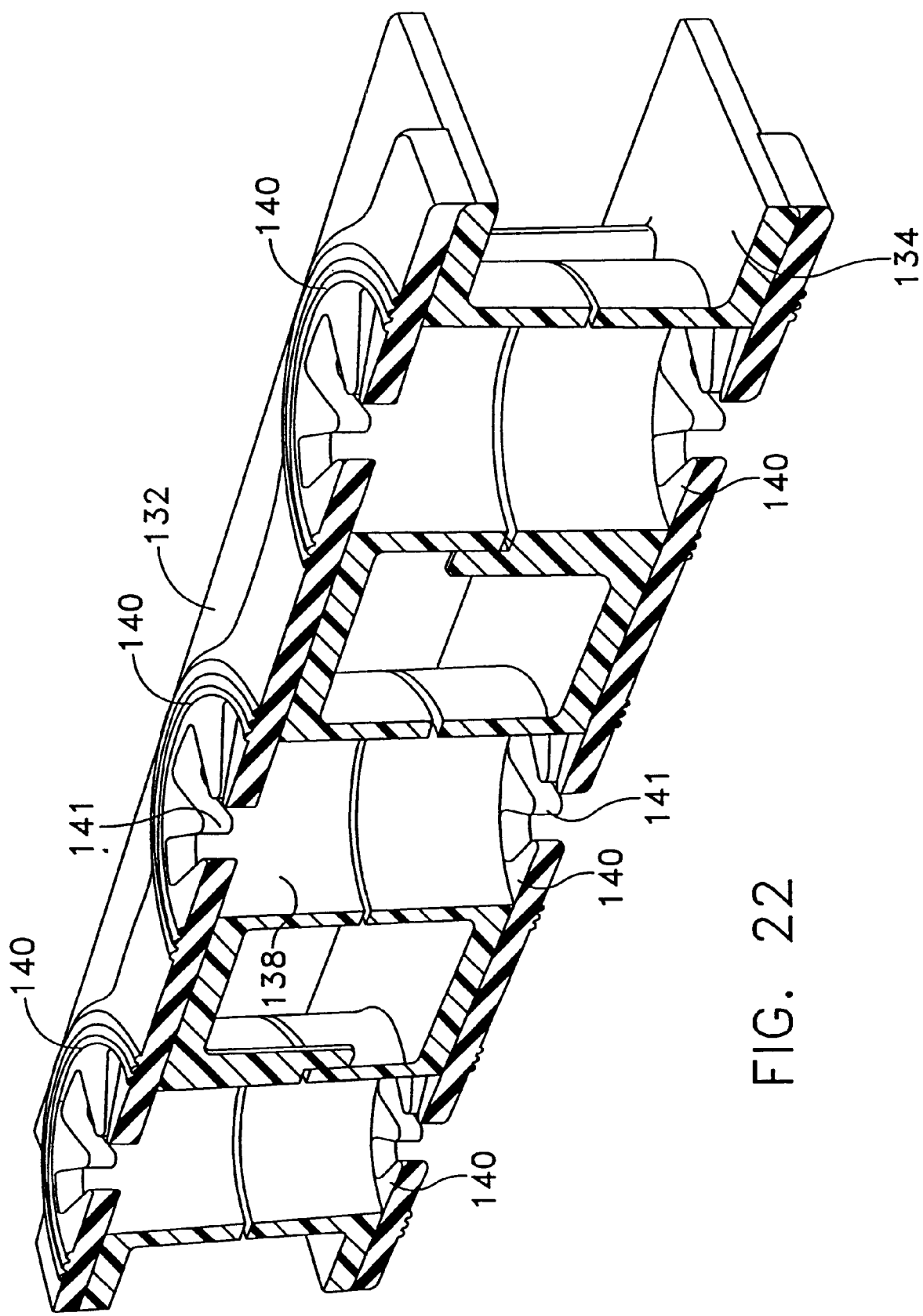
FIG. 22 is a cross-sectional view of the tool holder, as taken along lines 22—22 in FIG. 21.

Referring to FIGS. 17, 18, and 19, a roll of material, e.g., paper towels, wrapping paper, plastic wrap, etc., may be suspended between shelf-brackets 30 and below shelf 26 for convenient access. More particularly, a rod 118 comprises a pair of supports 120 positioned at each end. Rod 118 is inserted through the roll of material, and supports 120 are inserted into support openings 39 within lower web 38 of each shelf-bracket 30.

Figure 4:
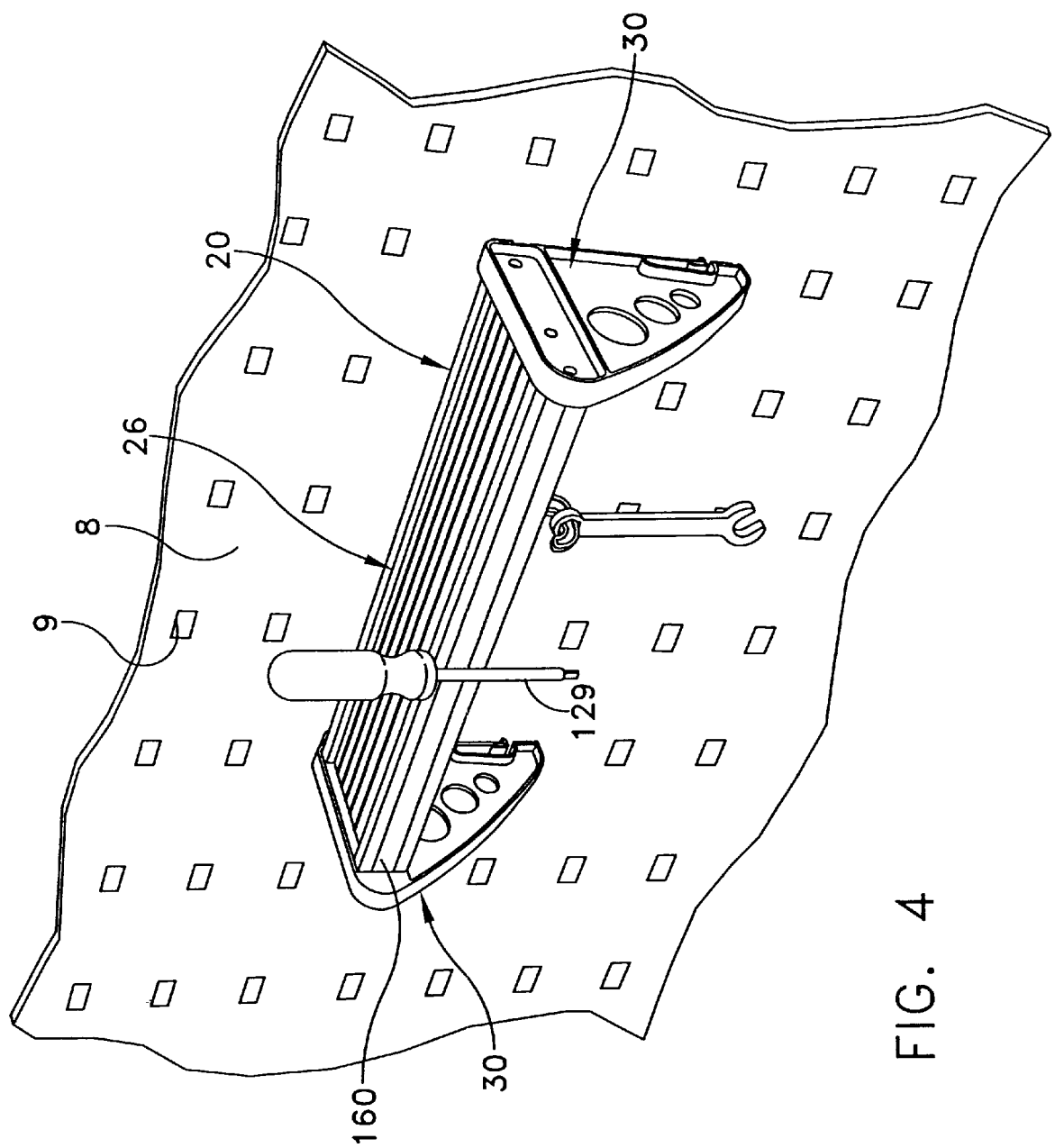
FIG. 4 is a broken-away, perspective view of a perforated panel and item holder formed in accordance with the present invention.
Figure 23:
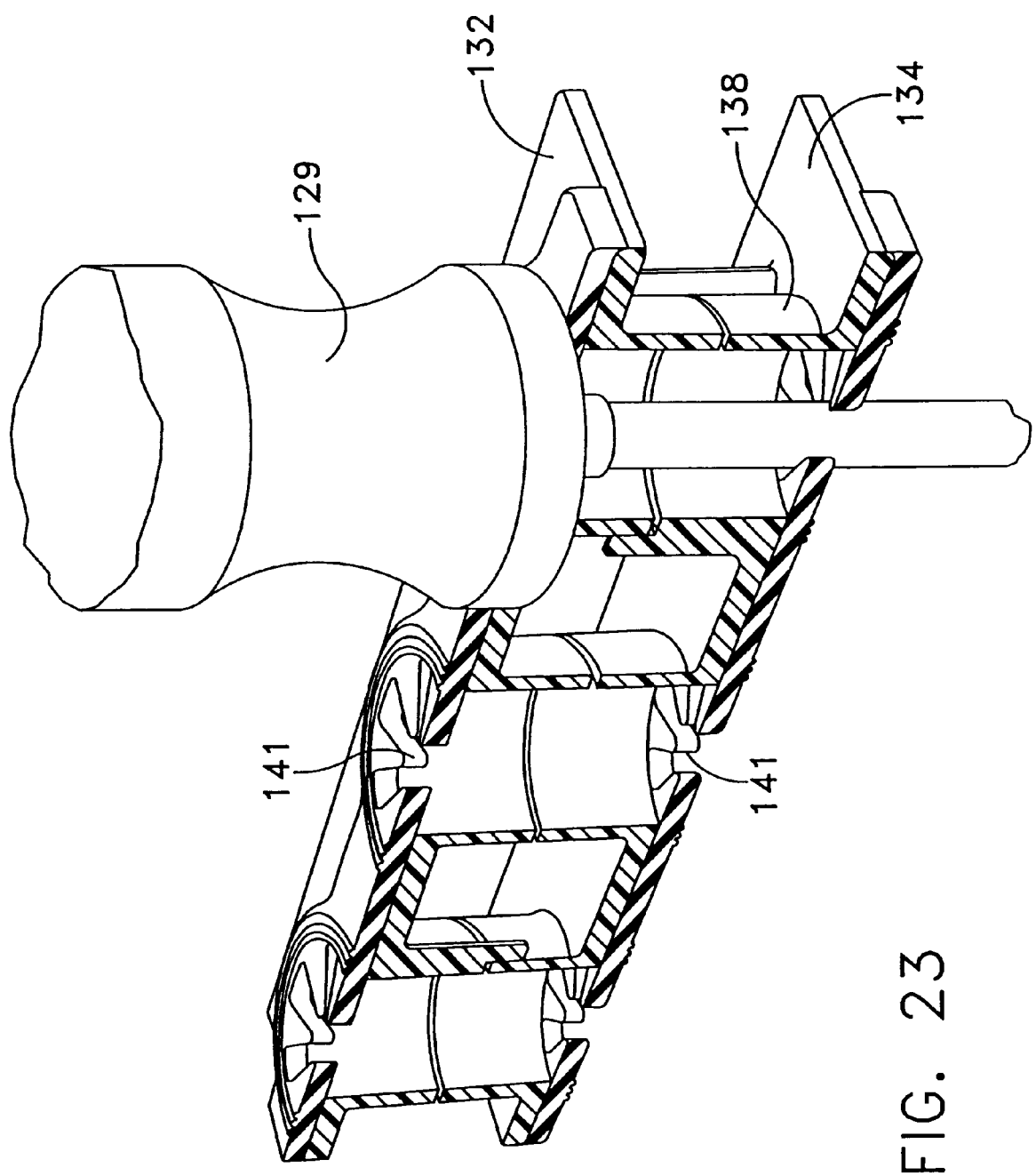
FIG. 23 is a cross-sectional view of the tool holder similar to FIG. 22, having a tool mounted within the tool holder.
Figure 24:
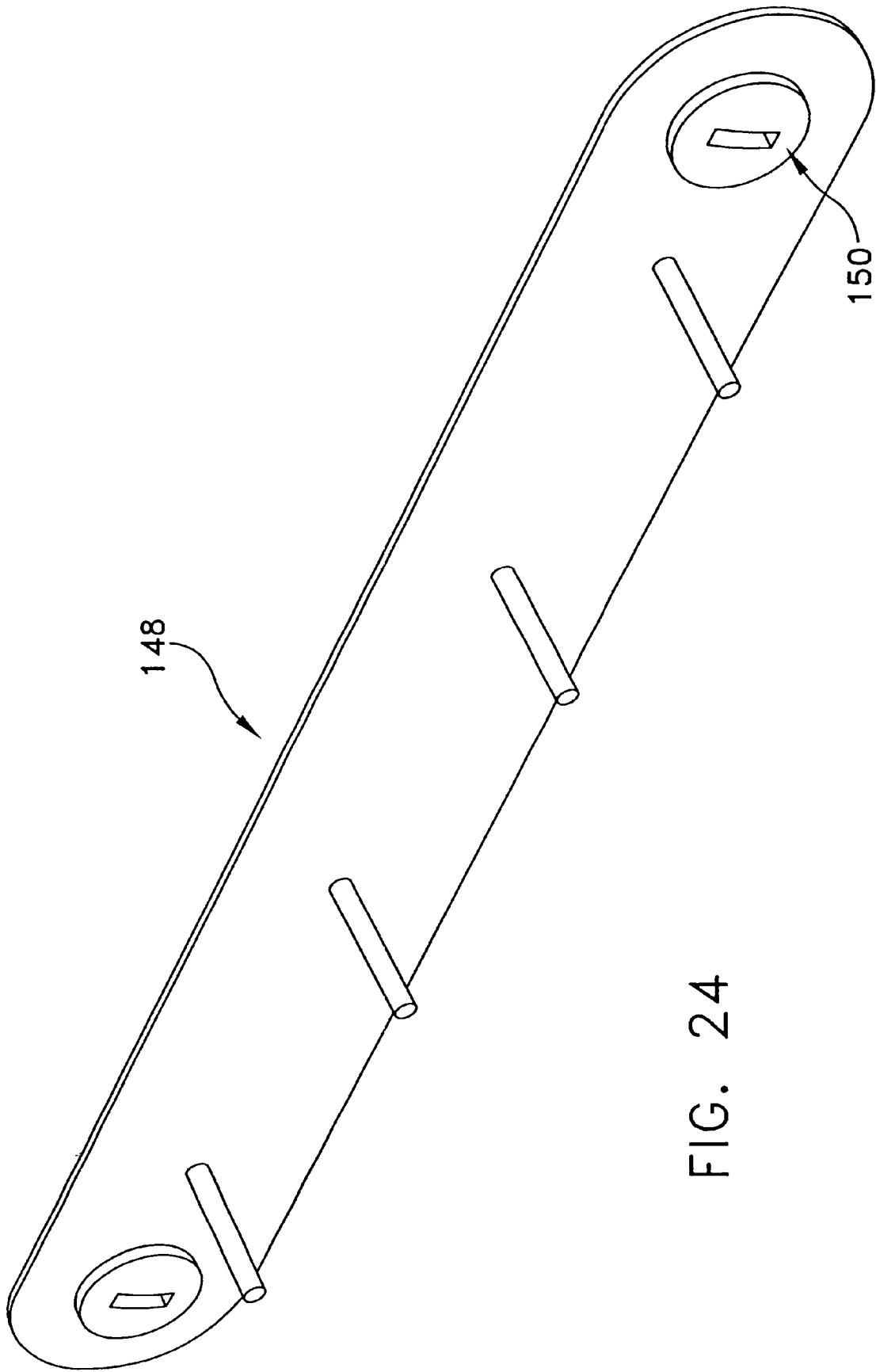
FIG. 24 is a post bracket that may be mounted to a perforated panel formed in accordance with the present invention by use of the lock button shown in FIG. 24.
Figure 25:
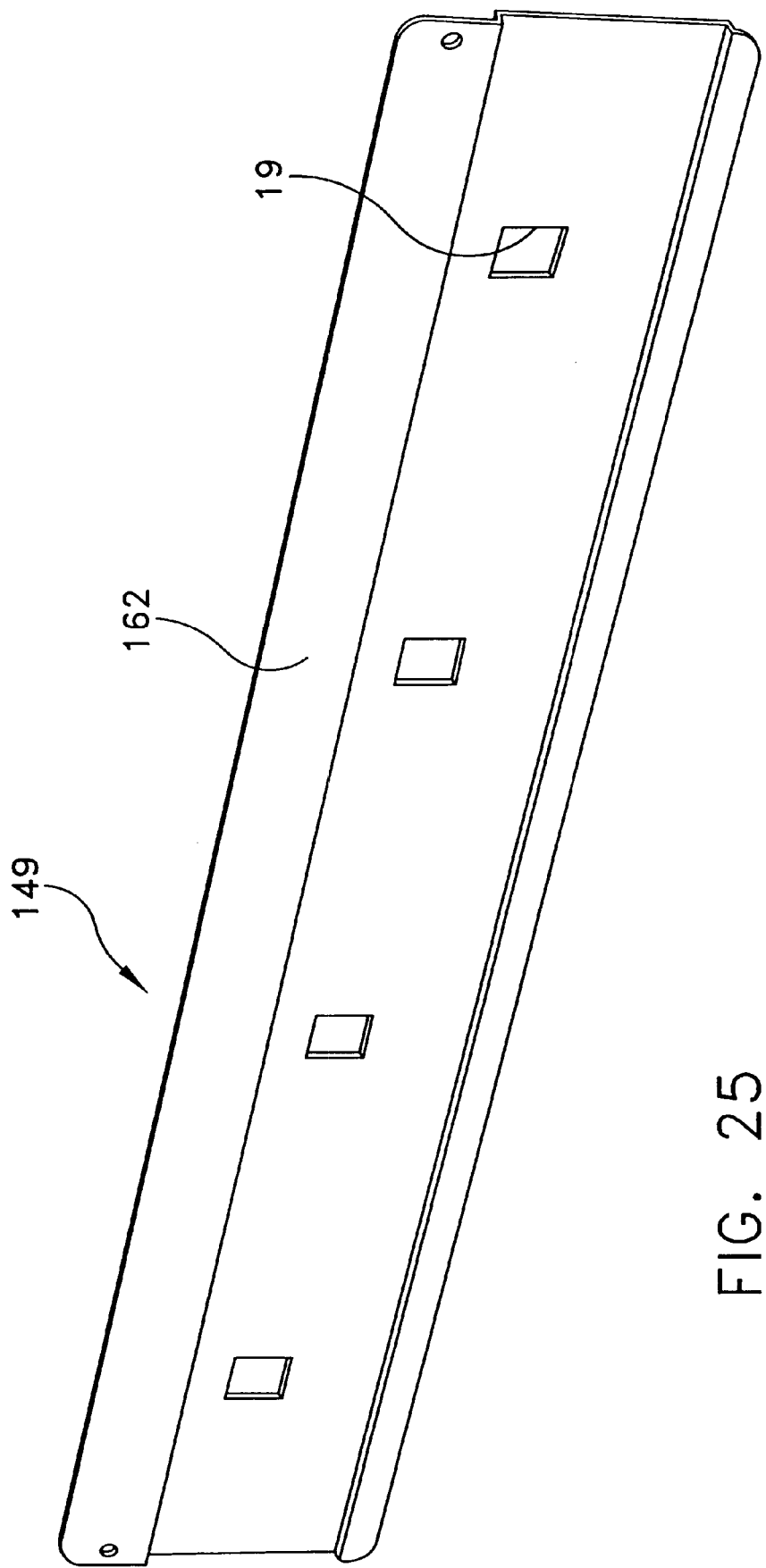
FIG. 25 is a receptacle support bracket.

Item holder 20 may also comprise a shelf 126 including a hand tool holder 130 that supports hand tools, e.g., screwdrivers, nutdrivers, awls, pliers, hand socket wrenches, etc., in an upright, vertical orientation, so as to improve the esthetics and accessability of the tools (FIGS. 20–23). More particularly, tool holder 130 is positioned within shelf 126, and comprises a top 132, a bottom 134, and a plurality of tubes 138 that are positioned between top 132 and bottom 134. A pair of tool support finger flanges 140 are positioned in top 132 and bottom 134, and within each tube 138. Each finger flange 140 comprises a plurality of resilient fingers 141 directed radially inwardly toward the cental axis of tube 138. In this way, when a tool, e.g., screwdriver 129 in FIGS. 4 and 23, is inserted through tool holder 130, its shaft is held between fingers 141 so that it does not wobble or flop over, and is readily accessible. Numerous holders 130 may be positioned within shelf 126, as needed. Moreover, shelf 126 is assembled to shelf-brackets 130 and perforated panel 8 in the same way that shelf 26 is assembled to shelf-brackets 30 and perforated panel 8.

Figure 26:
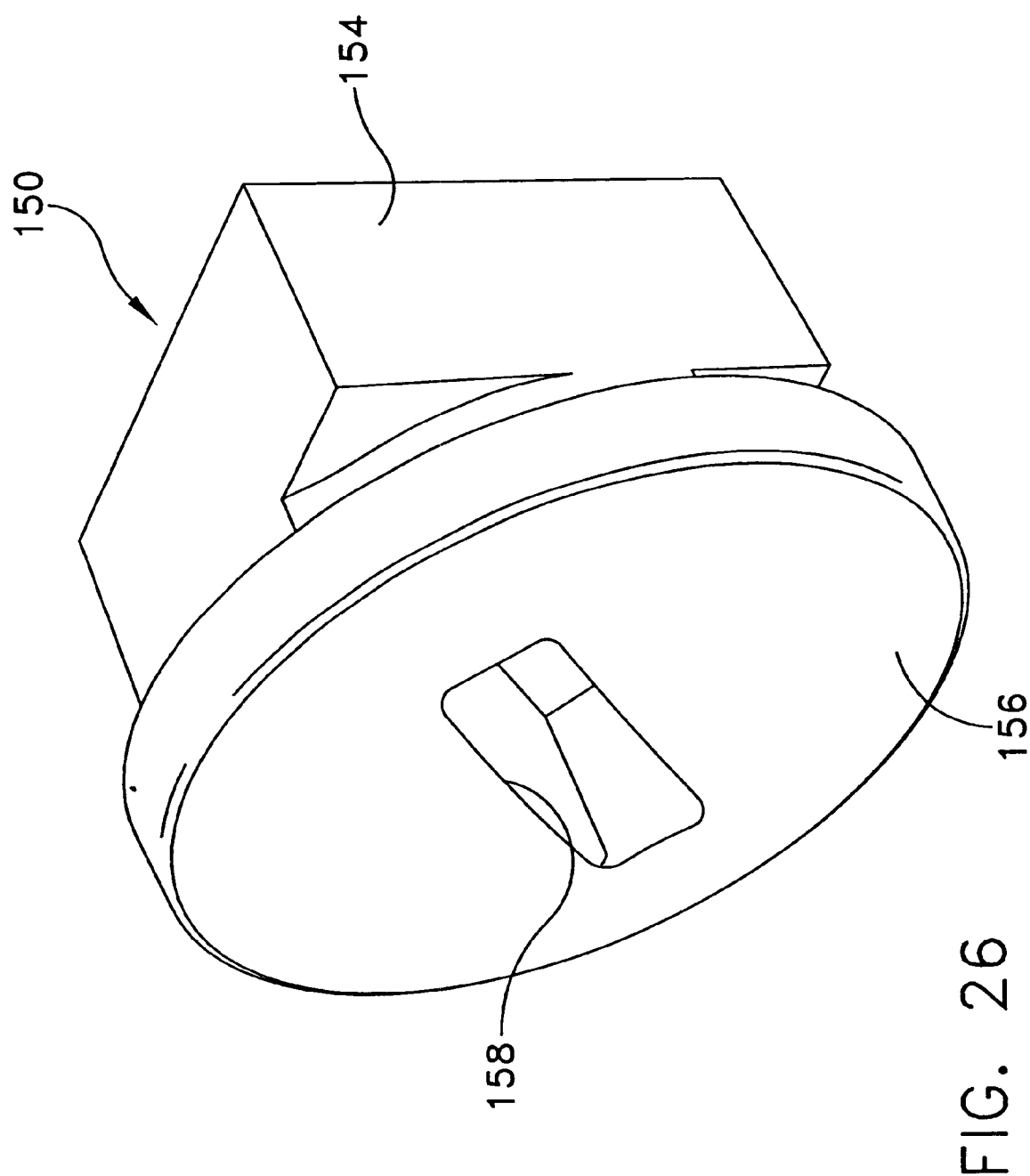
FIG. 26 is a perspective view of a lock-button used in accordance with the present invention.
Figure 27:
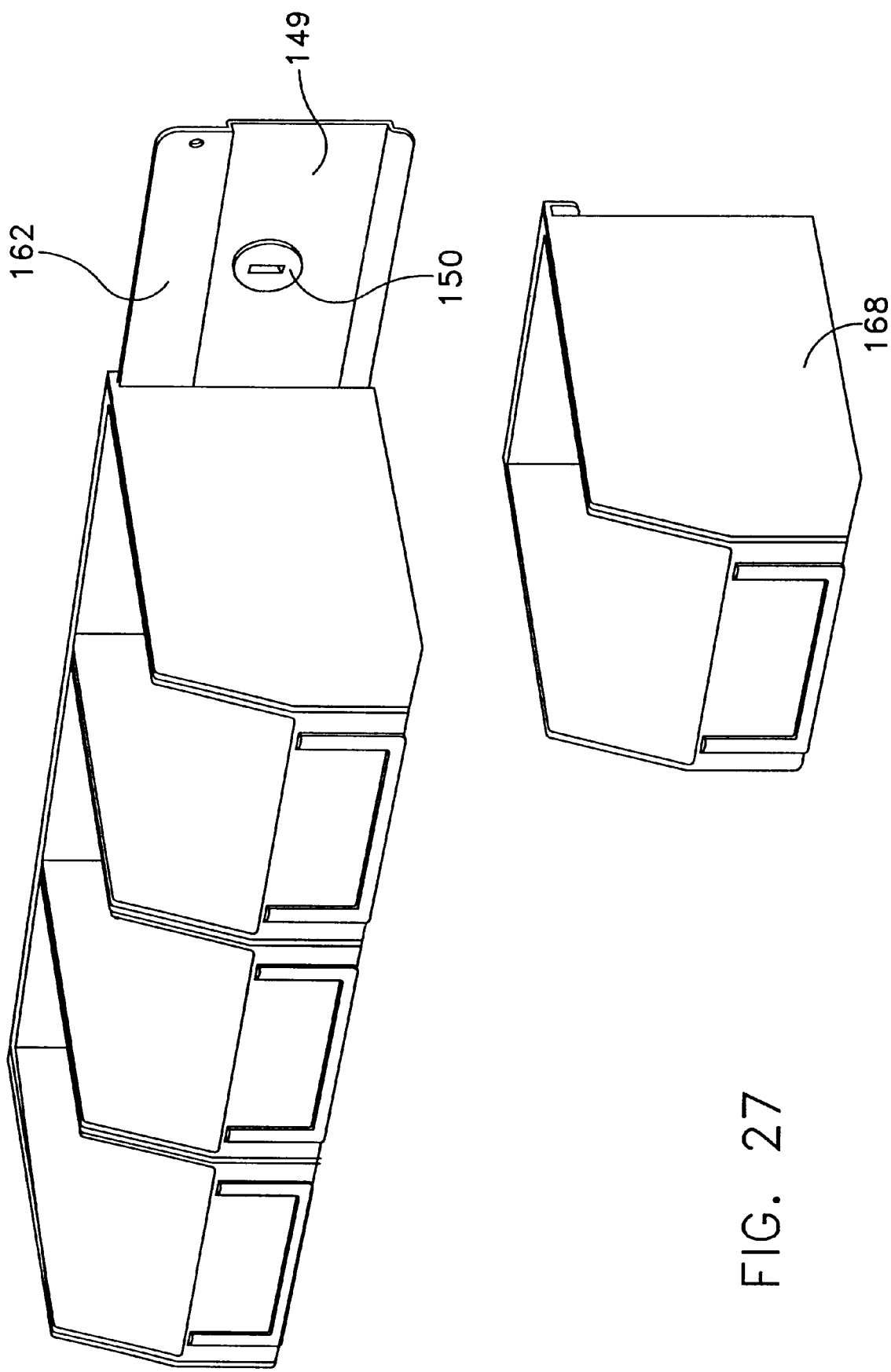
FIG. 27 is a perspective view of a receptacle support bracket as shown in FIG. 25, supporting a plurality of open faced receptacles.

Referring to FIGS. 24–30, alternative item holders may be used in connection with storage system 5. For example, post bracket 148 or receptacle bracket 149 may be held in place on perforated panel 8 by lock buttons 150 (FIG. 26). More particularly, lock buttons 150 comprise a rectilinear cam 154, a face plate 156, and a tool receptacle 158. Lock buttons 150 are sized, shaped, and arranged so that cam 154 may be slidingly received within a perforation 9. More particularly, cam 54 is first positioned in coaxial-aligned relation with a correspondingly shaped perforation 19, positioned within post bracket 148 or receptacle bracket 149. Both lock button 150, post bracket 148 or receptacle bracket 149 are then positioned in engaged relation with perforated panel 8, such that perforations 9 and 19 are coaxially aligned. Once in this position, lock button 150 is inserted through perforations 9 and 19, with rectilinear cam 154 oriented so as to correspond with the profile of perforations 9 and 19. Once inserted through perforations 9 and 19, face plate 156 is rotated, clockwise or counter-clockwise, by a tool inserted within tool mount 158, such that cam 154 rotates out of alignment with the edges of perforated panel 8 that define perforations 9 and 19.

Figure 28:
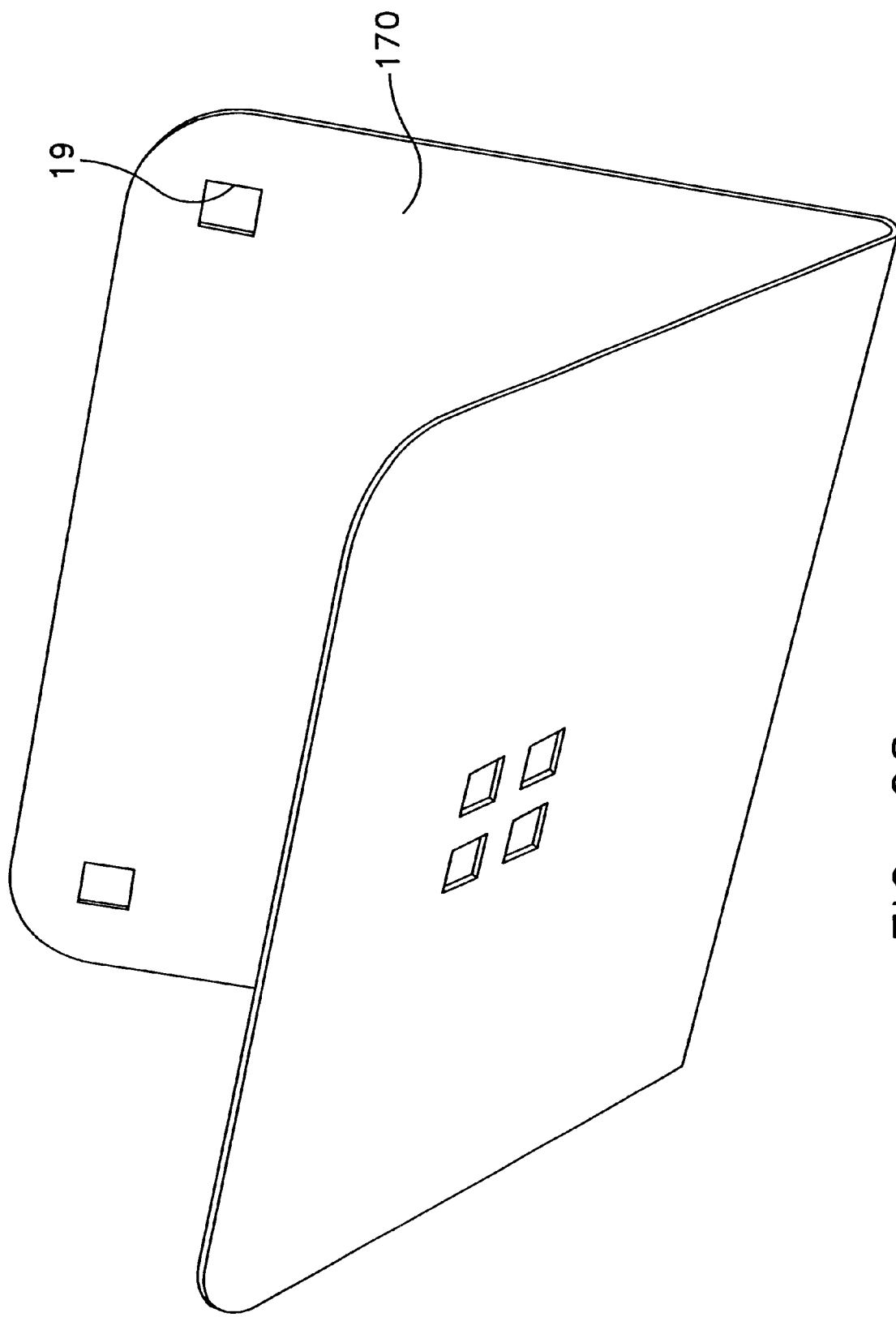
FIG. 28 is an angle shelf formed in accordance with the present invention.

Post bracket 148 may have a plurality of outwardly projecting posts, hooks, clamps, or a magnetic strip 160 (shown in FIG. 4 in connection with shelf 26) for hanging various tools or materials, as needed. Likewise, such means for hanging tools may also be combined with shelves 26 or 126, as desired. Receptacle bracket 149 includes a hook 162 that is adapted to engage a corresponding hook on an open faced receptacle 168, that may be hung from receptacle bracket 148. Likewise, an angled shelf 170 may be assembled to perforated panel 8 via lock buttons 150 in a similar manner (FIG. 28).

Figure 29:
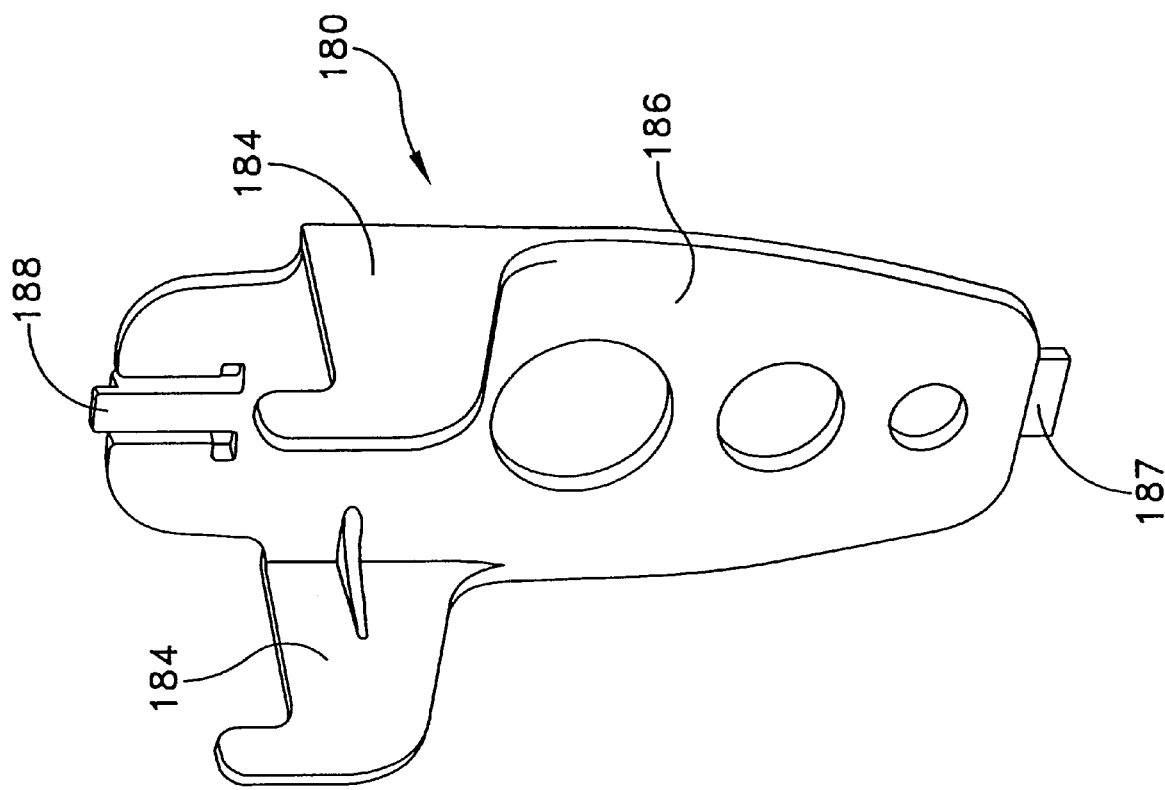

Referring to FIGS. 29 and 30, other item holders can be used in connection with storage system 5, such as dual hook support 180, or basket 182. More particularly, dual hook support 180 comprises a pair of hooks 184 that project outwardly from a back plate 186. A tab latch 187 projects downwardly from a bottom portion of back plate 186, and a latch cantilever 188 projects from a top of back plate 186. Dual hook 180 is assembled to perforated panel 8 by first inserting tab latch 187 into a perforation 9 of perforated panel 8. Back plate 186 is then pivoted about tab latch 187 until cantilever latch 188 is deflected into engagement with a corresponding perforation 9 in perforated panel 8.

Basket 182 is formed from a resilient polymer, and comprises a curved shell 183 having lower support tabs 190 projecting downwardly from a bottom surface and latch ears 192 projecting outwardly from the upper corner portions. To assemble basket 182 to perforated panel 8, latch ears 192 are deflected inwardly by pressing on the side walls of basket 182, while tabs 190 are inserted into respective holes 9. Basket 182 is then pivoted on tabs 190 until latch ears 192 are received within corresponding perforations 9. Once latch ears 192 are inserted within perforations 9, basket 182 is released, allowing latch ears 192 to spring outwardly into engagement with perforated panel 8.

It is to be understood that the present invention is by no means limited only to the particular constructions herein disclosed and shown in the drawings, but also comprises any modifications or equivalents within the scope of the claims.

What is claimed is:

1. A storage system comprising:
    a panel having a plurality of spaced regularly shaped and spaced perforations;
    at least one shelf having two end edges; and
    at least two shelf-brackets each including:
        a substantially circumferential flange,
        a receptacle portion for receiving one of said end edges of said shelf,
        an upper panel-catch and a lower panel-catch projecting outwardly from a same side of said circumferential flange in aligned spaced relation to one another, each of said upper panel-catch and said lower panel-catch (i) having a lock-tab projecting toward an outer surface of said circumferential flange, and (ii) being sized so as to be received within one of said plurality of spaced perforations; and
        a lock-release latch comprising a cantilevered beam including a lock-release tab positioned at a free end, and being positioned adjacent to said lower panel-catch so as to project from an end of said circumferential flange toward said lower panel-catch.

2. A storage system according to claim 1 wherein each of said brackets includes a first web that is bounded by said circumferential flange and a second web that is bounded by said circumferential flange such that a ledge projects outwardly in circumferential surrounding relation to said second web thereby separating said second web from said first web and thereby forming said receptacle portion.

3. A storage system according to claim 1 wherein said upper panel-catch and said lower panel-catch project outwardly from an outer surface of said substantially circumferential flange and comprise a substantially hook shape having said lock-tab projecting from a free end toward said substantially circumferential flange.

4. A storage system according to claim 1 wherein said lock-release latch is disposed adjacent to said lower panel-catch and said substantially circumferential flange comprises a recessed wall that is positioned in spaced relation to said lock-release latch so as to provide a recess within said substantially circumferential flange into which said lock-release latch deflects.

5. A storage system according to claim 1 wherein said shelf comprises a substantially channel shape including a top support surface, a nose positioned along one longitudinal edge, a panel flange positioned along another longitudinal edge in spaced parallel relation to said nose, and a pair of semi-tubular receptacles supported with said nose and said panel flange.

6. A storage system according to claim 5 wherein said receptacles comprise an inwardly directed slot and are positioned in spaced relation to inner surfaces of said nose and said panel flange, and project inwardly, toward one another.

7. A storage system according to claim 5 wherein a first ledge is formed at a lower extremity of said panel flange and is disposed in spaced relation to said top surface and a second ledge is formed at a lower extremity of said nose and is arranged in end-on, confronting relation to said first ledge.

8. A storage system according to claim 5 further comprising a shelf hook having a shank, a support arm, and a catch including an upper cantilevered latch, a lower cantilevered latch, and a stabilizer tab positioned therebetween wherein said stabilizer tab, said upper cantilevered latch and said lower cantilevered latch project outwardly from an upper portion of said shank.

9. A storage system according to claim 8 wherein each of said upper cantilevered latch and said lower cantilevered latch include a ramp surface and a shoulder and have a curved profile defining opposed inner curved surfaces with said stabilizer tab projecting outwardly from said shank and positioned between said inner curved surfaces.

10. A storage system according to claim 8 wherein said shelf hook is assembled to a perforation in said panel by engaging an edge of said panel that defines said perforation.

11. A storage system according to claim 1 wherein said shelf comprises a substantially channel shape including a top support surface, a nose positioned along one longitudinal edge, a panel flange positioned along another longitudinal edge in spaced parallel relation to said nose, a first ledge formed at a lower extremity of said panel flange and disposed in spaced relation to said top support surface and a second ledge formed at a lower extremity of said nose and arranged in end-on, confronting relation to said first ledge; and
    an open-ended receptacle releasably engaged with said shelf, said open-ended receptacle having a front cantilevered latch and a rear cantilevered latch formed adjacent to an open end wherein each cantilevered latch comprises a shoulder-catch and a pair of spaced apart cam ears each including a front ramp, whereby said open-ended receptacle is releasably assembled to said shelf by engagement of said shoulder-catches with said first and second ledges of said shelf.

12. A storage system according to claim 1 wherein said shelf-brackets comprise at least one web positioned within said circumferential flange and defining at least one through-hole; and
    a roll of material suspended between said shelf-brackets and below said shelf from a rod having two ends, wherein each end is positioned within said at least one through-hole in said web and thereby supported by each shelf-bracket.

13. A storage system according to claim 1 wherein said shelf includes a hand tool holder that is positioned within said shelf, and comprises a top, a bottom, and a plurality of tubes that are positioned between said top and said bottom, wherein each of said tubes further includes a pair of tool support finger flanges having a plurality of resilient fingers directed radially inwardly toward a central axis of said tube and adapted to receive and support a shaft of a hand tool.

* * * * *

UNITED STATES PATENT AND TRADEMARK OFFICE
CERTIFICATE OF CORRECTION

PATENT NO. : 6,702,128 B2  
DATED : March 9, 2004  
INVENTOR(S) : Alan Winig et al.

Page 1 of 1

It is certified that error appears in the above-identified patent and that said Letters Patent is hereby corrected as shown below:

Column 9,
Line 34, delete "spaced regularly shaped and spaced"

Signed and Sealed this

Twentieth Day of July, 2004

JON W. DUDAS
*Acting Director of the United States Patent and Trademark Office*